INVENTOR.
JOHN D. MARGERUM,
BY
ATTORNEY

INVENTOR.
JOHN D. MARGERUM,

BY

ATTORNEY.

INVENTOR.
JOHN D. MARGERUM,
ATTORNEY.

United States Patent Office 3,556,794
Patented Jan. 19, 1971

3,556,794
**METHOD OF INHIBITING PHOTOPOLYMERIZA-
TION AND PRODUCTS THEREFOR**
John D. Margerum, Chatsworth, Calif., assignor to
Hughes Aircraft Company, Culver City, Calif., a corporation of Delaware
Filed Oct. 3, 1966, Ser. No. 583,651
Int. Cl. G03c 5/32
U.S. Cl. 96—45.2                    18 Claims

ABSTRACT OF THE DISCLOSURE

Method of optically polymerizing and optically desensitizing photopolymerization of a photopolymerizable composition containing polymerizable ethylenic monomers, a light-sensitive polymerization catalyst system and a light-sensitive polymerization inhibitor material, the steps consisting of irradiating the composition with radiation to activate polymerization of said composition and with radiation activating said inhibitor to deactivate photopolymerization of said composition, and composition therefor.

---

The present invention relates to the method of desensitization of light-sensitive photopolymerizable compositions containing a light polymerization catalyst and a polymerization inhibitor, compositions therefor and the products thereof. More particularly, the present invention relates to an optical method of desensitization of light-sensitive photopolymerizable compositions, with or without partial polymerization of the composition employing photocatalyst systems for the initiation of addition polymerization by the absorption of radiant energy, particularly usfeul in photography and photographic reproduction.

Photopolymerization of light-sensitive polymerizable ethylenic compounds is known to be initiated by the use of photosensitive polymerization initiators which act catalytically to induce such compounds to polymerize. The light polymerization process is applicable to resinous material, as vinyl and like compounds, including fluorocarbons containing unsaturated polymerizable ethylenic linkages which, in an analogous relationship, are also vinyl compounds. In general, upon exposure of such light-sensitive compositions to radiation which can activate the photosensitive polymerization initiators, some of the light-sensitive photopolymer composition immediately commences to polymerize, in accordance with the radiation received, thereby producing a faithful image reproduction of the radiation. To prevent further polymerization, after the image has been formed to the desired density, the still light-sensitive resinous photopolymer composition must be desensitized or inactivated. If this is not accomplished, the polymerizable composition will continue to polymerize when subjected to further irradiation with light. Such continued polymerization will diminish the quality of the photopolymer image by making the image less distinguishable from the background. For these reasons desensitization of the light-sensitive polymerizable resinous composition must occur quickly after image formation to a desired density has been achieved if the high quality image is to be retained upon further exposure to light.

Desensitization of the light-sensitive photopolymer compositions can be obtained by removal of monomer therefrom, as by dissolution of the monomer with a solvent, leaving the polymerized image portion intact. Such extraneous "fixing" agents do not lend themselves to ultra-rapid processing and require additional equipment for the containment of the extraneous agent. Additionally, such prior art fixing methods must ordinarily be performed under darkroom conditions to prevent photopolymerization during the fixing stage. This means that greater care and more time are needed to fix the polymer image by prior art methods. It would thus be advantageous to be able to temporarily create a determinable image by optical means and permanently fix a photosensitive composition without the necessity of doing so under darkroom conditions.

Accordingly, the practical usefulness of the methods and compositions preferred herein are concerned with temporary desensitization of visible light polymerization systems. However, an occasion for modification of desensitizing an invisible light polymerization system with a suitable temporary desensitizing material, as provided herein, may occur. For example, where it may be desired to fix partial polymerization of the composite whole or initiate desensitization with a near ultraviolet radiation, radiation in the ultraviolet range on the order of 2000 A. to about 4000 A. may be utilized, and about 4000 A. to about 7200 A. or more to effect polymerization, as will hereinafter become apparent.

As previously noted, prior art fixing methods, although capable of completely desensitizing a photosensitive composition, were relatively slow. A process for rapidly desensitizing photosensitive compositions containing a photo-redox catalyst system has been disclosed in the copending applications filed concurrently herewith, entitled: "Photopolymer Polymerization Fixation Process and Products," Ser. No. 583,650, Leroy J. Miller and John B. Rust, and "Photopolymer Fixation Process and Products," Ser. No. 583,649, John B. Rust, hereafter referred to as "Miller et al. copending application" and as "Rust copending application," both patent applications being likewise assigned to the instant assignee, Hughes Aircraft Company. Such processes, as described therein, have the advantage of not requiring the addition of any extraneous fixing agents after image-forming irradiation but generally still require darkroom conditions during the fixation step. The Miller et al. and Rust copending applications, just referred to, represent a great advance over the prior art in the techniques of quickly permanently desensitizing the light-sensitive compositions and enabling the photopolymer image to be rapidly viewed under visible light.

The present invention provides a method of first creating an invisible latent image subsequently polymerizable and viewable in visible light with a desensitized background or otherwise a visible light image with a desensitized background or both the image and background simultaneously desensitized to provide an advance over the prior art and enable a further increase in the speed in which an image can be viewed. The image being recognizable herein as a composite of a picture as in a photographic representation. The fixation process of this invention is capable of temporarily desensitizing the herein described photosensitive compositions in less than a second. Permanent densitization can be provided, after temporary desensitization by the method and means of this invention, by any appropriate fixation process with the added advantage of being able to perform such a step in the presence of visible light.

As used herein, and for purposes of illustration, the terms "light-sensitive compositions" and "photosensitive compositions" will refer to compositions comprising a combination of polymerizable monomers and light polymerization catalyst systems therefor such as the preferred photo-redox catalyst system. The term "photo-redox catalyst system" will define a catalyst system comprising (1) a photo-oxidant or dye capable of being raised to a photoactive state by the absorption of light having wavelengths lying between about 3800 A. and about 7200 A. and, in this photoactive state, being capable of removing an electron from (2) a reducing agent, or (3) a catalyst to produce a free radical capable of initiating polymerization of the polymerizable monomers. The term "photopolymer mass" is used interchangeably herein and in the claims with the terms "photopolymer image" and "image," which image is created by visible light polymerization of either the image per se or its background, either by initial desensitization or subsequent desensitization by invisible radiation.

It is a major object of my invention to provide a completely optical method of forming a photopolymer image in a photosensitive composition and temporarily but completely fixing such a photopolymer image therein, which method and means permits viewing of photopolymer images in visible light almost immediately after they are formed.

Another object of my invention is to provide an optical method and means for temporarily desensitizing light-sensitive polymerizable compositions with image formation therein, which can be combined with optical printing and read-out systems to provide a totally optical, rapid projection system.

It is a stil further object of my invention to provide an optical desensitizing method and means for immediately temporarily desensitizing light-sensitive polymerizable compositions after image formation therein which can be combined with perment desensitizing processes without the need to perform said permanent desensitizing processes in the dark.

An additional object of my invention is to provide photosensitive polymerizable compositions containing a light activable polymerization catalyst with a desensitizing medium which optically renders the polymerization catalyst inactive for viewing of a photopolymer image with visible light.

It is another object of my invention to provide a method and means for forming photopolymer images in photosensitive compositions by first irradiating such compositions with light at one wavelength or discrete range of wavelengths and thereafter temporarily fixing the photopolymer image by irradiating with light at another wavelength of discrete range of wavelengths, which method and means can be combined with permanent fixing means.

It is still another object of my invention to provide a method and means for forming images in photosensitive compositions comprising first irradiating such compositions with radiant energy at one wavelength or discrete band of wavelengths to thereby produce an image comprising desensitized areas and thereafter uniformly irradiating the photosensitive compositions at another wavelength or discrete band of wavelengths, to polymerize the areas unexposed during the first irradiation, which method and means can be combined with permanent fixing means.

Other objects and advantages will become apparent from the following description and from the drawings in which.

Figure 1:
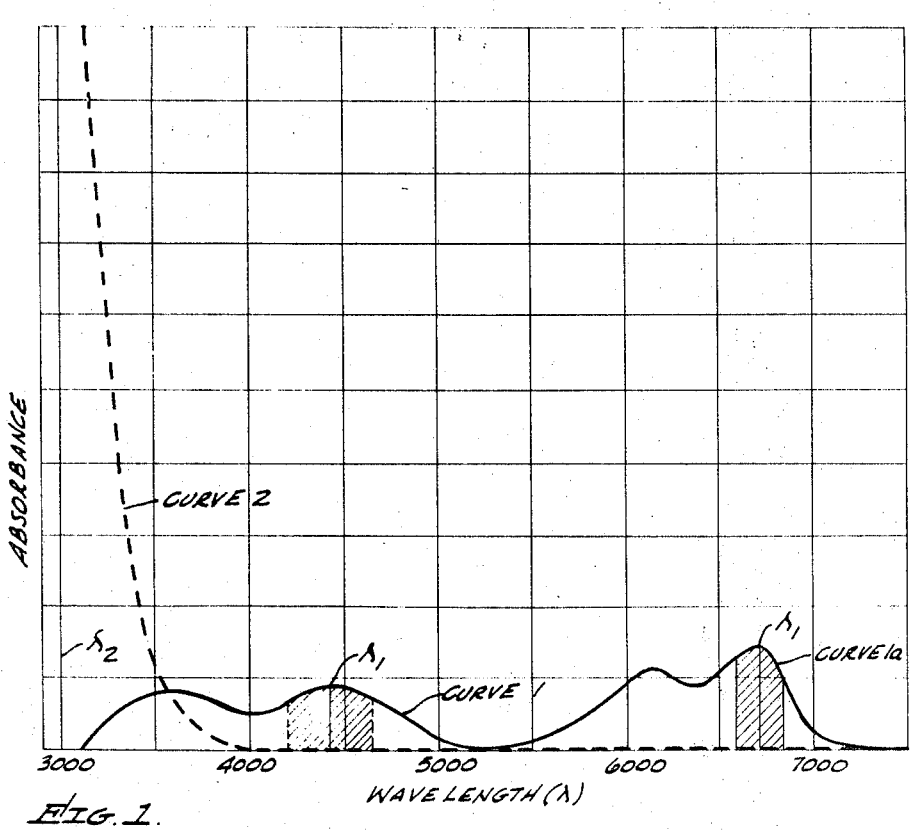
FIG. 1 is a graphical represenation of absorption spectra of particular components of this invention illustrating the wavelengths at which image formation and image fixation may be effected by the method of this invention.
Figure 2:
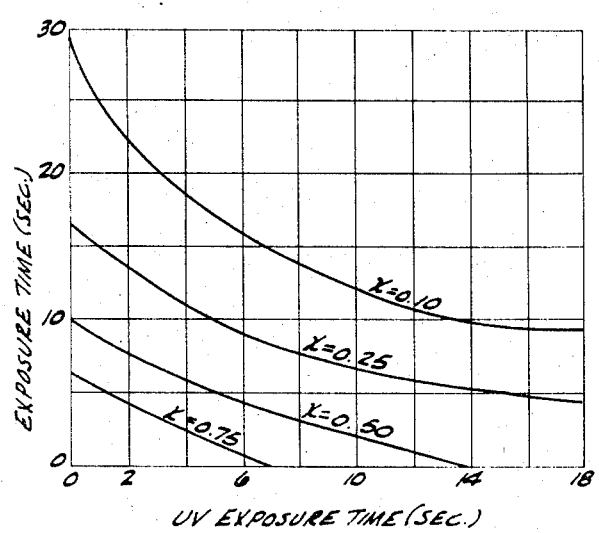
FIGS. 2–9 are graphical representations illustrating the increase in optical density of the herein described photosensitive compositions due to photopolymer image-forming irradiation as a function of variations in prior exposure to desensitizing radiation.
Figure 3:
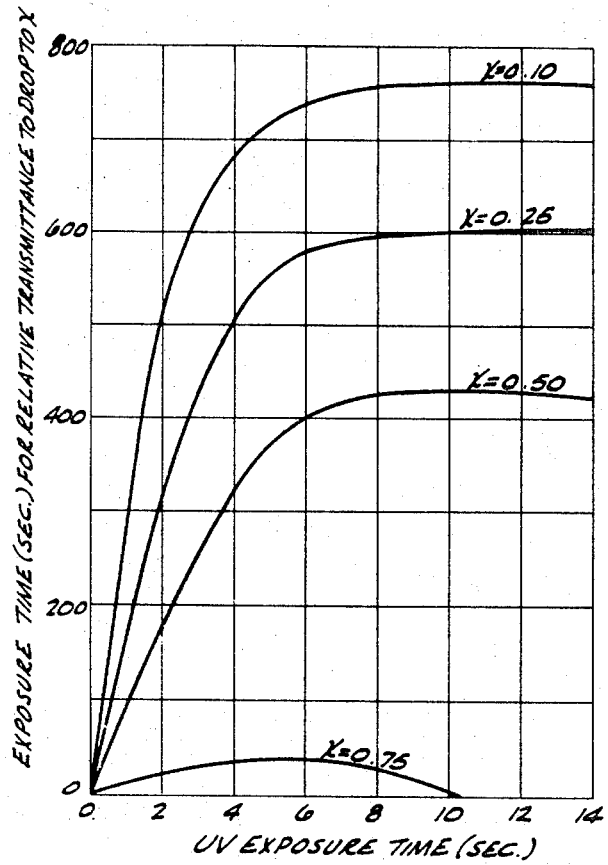

I have now discovered that temporary but substantially complete to complete desensitization of the whole, or limited areas, of light-sensitive compositions containing a polymerization inhibitor can be optically obtained without physically removing the unreacted materials. Additionally, I have discovered that such temporary, but relatively complete, desensitization can be accomplished by optical means when one or more photochemical desensitizing agents is present in the polymerizable light-sensitive photopolymer composition, and before or after partial visible light polymerization. Specifically, I have discovered that temporary, but momentarily complete, optical desensitization of light-sensitive compositions may be brought about, in whole or in part, by irradiating a light-sensitive photopolymer composition, containing a polymerization inactivating or desensitizing material, with invisible light, and before or after initiating polymerization by visible light. That is, I have provided a photopolymerizable composition including a desensitizing agent having a nitrobenzyl moiety in combination with a carboxylate group and being capable of stopping the photosensitive polymerization probably by absorbing energy to deactivate the polymerization process but which energy is not absorbed to activate the photo-redox or polymerization catalyst system, and the optical processing for utilizing such compositions. Proper irradiation of a light-sensitive photopolymer composition containing one or more of the desensitizing agents temporarily, but completely, inactivates the photo-redox or polymerization catalyst system, in whole or in part, and thus temporarily, but completely, prevents further polymerization, in whole or in part, when the light-sensitive composition is subjected to visible light. Thus, I have now discovered both the method of creating an invisible or latent image by first irradiating a polymerizable photosensitive composition with an invisible light image or replica with subsequent visible light polymerization of the background area to make the latent image visible, and the method of first irradiating with a visible light image or replica and subsequently irradiating the background with invisible light to fix or desensitize the background area. In either instance, the background or the image is correspondingly desensitized by the application of appropriate invisible light, with relative and corresponding inhibition of polymerization by visible light, as hereinafter illustrated.

As used herein, the term "desensitize" when referring to desensitization by the method of this invention, will be understood to denote temporary but substantially or relatively complete desensitization, i.e., visually determinable inhibition or substantially stopping photopolymerization in whole or in part of photosensitive compositions by visible light for up to about fifteen or more minutes.

Although it is not certain how the reactions involved herein proceed, it is believed that absorption of radiation by the added desensitizing ionic material yields a product which is capable of reacting with the photo-oxidant component of the polymerization catalyst system to prevent the photo-oxidant from being raised to the photoactive state and thereby momentarily and temporarily preventing polymerization of the monomers from taking place when the photosensitive composition is subjected to visible light. The interaction of the photochemical product of the desensitizing agent and the photo-oxidants usable in this invention, by which the photo-oxidants are, in effect, removed from the photo-redox catalyst system, will hereafter be referred to as "inactivating" the photo-oxidant or the photo-redox catalyst. The form which the photo-oxidant assumes when "inactivated" will be referred to as the "polymerization-inactive" form or simply the "inactive" form, whereas the initial form of the photo-oxidant will be referred to as the "polymerization-active" form or simply the "active" form. As previously described, the photo-oxidant when in the latter form, can be raised, by absorption of light of appropriate wavelengths in the absence of an activated desensitizing agent, to a "photoactive" state in which it is capable of initiating free radical formation.

Furthermore, it is also believed that the desensitizing agents of this invention form polymerization inhibitors, as a result of absorption of radiant energy. Such polymerization inhibitors appear to inhibit polymerization even if the resulting inactive form of the photo-oxidant (polymerization catalyst) is later oxidized or converted to the active form in the reaction media or otherwise. Such inhibition of polymerization is not permanent, however, since the polymerization inhibitors produced by activation of my desensitizing agent decrease in effectiveness after a period of time, probably due to interactions with each other and because the inhibiting species derived from my desensitizing agents, herein and hereafter designated as "inhibitor intermediates," return to their original form or convert to a non-inhibiting form. Permanent desensitization can thereafter be accomplished by any of the standard methods of fixing photopolymers, or by means set forth in the copending Miller et al. and Rust patent applications and incorporated herein by reference thereto.

In general, desensitization by the method of my invention is accomplished by: (1) adding to a light-sensitive composition before irradiation thereof, a densensitizing agent which of itself or in ionic form can absorb radiation at wavelengths ($\lambda_2$) which will cause inhibition of the normally polymerization-initiating properties of the photo-redox or polymerization catalyst system. Thus, upon irradiation at wavelengths ($\lambda_2$) the desensitizing agents of this invention probably form chemically reactive molecular species which are capable of reacting with the photo-oxidant or catalyst system to reduce or inactivate the system to a state incapable of causing photopolymerization of the polymerizable monomers (polymerization-inactive state); (2) exposing the light-sensitive composition first to radiation ($\lambda_1$) to which the photo-oxidant is sensitive, but to which the desensitizing agent is insensitive, to thereby initiate polymerization of the polymerizable monomer and produce a photopolymer image in the presence of the desensitization material; (3) exposing the light-sensitive photopolymer composition to radiation ($\lambda_2$) to activate the desensitizing agent and thereby temporarily desensitize the light-sensitive photopolymer composition as heretofore stated; or (4) otherwise a controlled combination of $\lambda_1$ and $\lambda_2$ can be used to effect image reproduction. Radiation at $\lambda_2$ produces an almost immediate desensitization, that is, within a few seconds, or less, for example, within $1.5 \times 10^{-4}$ seconds, and the desensitization will last, in a properly formulated and operable light-polymerizable system, for at least several minutes. Thus, an almost immediate display of information or images, which would otherwise quickly disappear by continued polymerization, can be produced. A permanent fixing of the image or other information can be had by standard fixing methods of the art, e.g., by washing out unreacted monomer or photoredox catalyst components or both, or fixing by the methods described in the Miller et al. and Rust applications, i.e., by control of pH and heating or by addition of a permanent fixing agent and heating, with the change therein that such fixing may now be accomplished in visible light.

Hereafter, the light-sensitive composition, with or without a photopolymer image will be referred to as "a light-sensitive photopolymer composition." Furthermore, $\lambda_1$ will be used to denote the wavelength(s) used to initiate polymerization and $\lambda_2$ will be used to denote the wavelength(s) used to activate the desensitizer material and desensitize the light-sensitive polymerizable composition. For example, a visible light radiation $\lambda_1$, to effect polymerization, may be on the order of 3800 A. or 4000 A. to about 7200 A., whereas, $\lambda_2$ radiation in the range of invisible radiation, is on the order of from about 2000 A. to about 4000 A. As is known to the art, a high order of invisible radiation and a low order of visible radiation appear to overlap in wavelengths and yet retain a distinction between visible light and invisible light radiations. In this seeming overlap lies a region wherein a low order of visible light, as blue light, also appears to effect an initial desensitization.

To further describe the scope of my invention, reference is made to FIG. 1 which represents typical absorption curves for a photo-oxidant (Curve 1—riboflavin) and for a desensitizing agent (Curve 2) used in my invention. It will be noted that the Curves 1 and 2 overlap. However, this is immaterial to the operation of my invention, since image-forming wavelengths can be chosen to which the desensitizing agent is insensitive, or otherwise desensitizing wavelengths can be chosen to which the other component, the photo-oxidant, is insensitive. Curve 1a illustrates the absorption curve of another photo-oxidant (methylene blue) which may be employed in the invention.

As shown in FIG. 1, the photo-oxidant is sensitive to $\lambda_1$, but insensitive to $\lambda_2$. Conversely, the desensitizing agent is sensitive to $\lambda_2$ but not to $\lambda_1$. Therefore, a $\lambda_2$ exposure is used to desensitize the composition by causing the $\lambda_2$-sensitive, desensitizing agent to form a chemically active, inhibitive species. Thus, as an applicable method of this invention, a photosensitive polymerizable composition may first be irradiated with $\lambda_2$ radiation through a transparency to produce a latent image comprising desensitized areas in the photosensitive composition. The exposure to $\lambda_2$ radiation is then followed by a uniform exposure to $\lambda_1$ radiation, whereupon the areas previously unexposed to $\lambda_2$ are polymerized. This method produces a positive polymer image in which the opaque areas correspond to the opaque areas of the original transparency. The method in which a polymer image is first formed by exposure of the polymerizable composition to a visible light impression with wavelengths $\lambda_1$ and in which subsequent uniform irradiation with invisible light with wavelengths $\lambda_2$ is used to desensitize the background to visible light, results in the formation of a negative polymer image which has opaque areas corresponding to transparent areas of the original transparency.

As presently noted, it is important that only the photo-oxidant (polymerization activator) and the desensitizing agent be capable of being relatively activated or inactivated in the order of the application of each of the wavelengths $\lambda_1$ and $\lambda_2$. The proximity in the electromagnetic spectrum of $\lambda_1$ to $\lambda_2$ is unimportant for the purpose of this invention, and $\lambda_1$ and $\lambda_2$ theoretically may be quite close and appear to be overlapping. However, from a practical standpoint, it is preferable to maintain a difference between $\lambda_1$ and $\lambda_2$ sufficient to prevent inadvertent polymerization during the desensitization step. Furthermore, $\lambda_1$ and $\lambda_2$ may be monochromatic or they may represent bands of radiation, as shown, for example, by the shaded areas in FIG. 1.

The desensitizing material in the photosensitive polymerizable composition must be capable of photochemically forming a chemically-inactive species that will thereafter be capable of inactivating the photo-oxidants, or polymerization catalyst system, and thereby inhibit catalytic polymerization of the light-polymerizable monomer composition. However, the desensitizing ion, in its inhibitor-intermediate form, must not act as a polymerization initiator to cause further polymerization of the light-polymerizable composition. Additionally, the desensitizing material providing the active ion must be compatible with the other components of the light-sensitive composition.

The desensitizing materials embodied herein are essentially combinations of a nitrobenzyl moiety with a carboxylate group or groups which make them capable of inhibiting photopolymerization by generating photochemically dye-reducing inhibitors of free radical polymerization. Otherwise, such materials, when activated by invisible radiation, momentarily desensitize or stop the activity of photopolymerization. The operable compositions of ionizable desensitizing agents are aromatic compounds containing one or more carboxyl groups in combination with a nitro group, or nitro groups, such groups being present in an operative association or molecular form which renders the desensitizing agents capable, when activated by invisible light, or invisible radiation, of stopping polymerization by counteracting or withdrawing the active property of the photosensitive photo-redox or photo-catalyst system.

Such ion forming structures are exemplified by soluble and ionizable carboxylic acid derivatives of 2- and 4-nitrotoluene, 3-carboxyl 4-nitrophenylacetic acid and derivatives thereof having a nitrobenzyl moiety with one or more nitro and one or more carboxylate groups in active polymerization inhibitor association. Other materials exemplary of such ion forming groups are 2 and 4-nitrophenylacetic acid and derivatives, including the soluble salts of each thereof, and mixtures of the same, having a nitrobenzyl moiety with one or more carboxylate groups and one or more nitro groups in active association with the same or different aryl ring.

Illustrative of a preferred group of desensitizing materials containing such inhibiting property are the following ions: 5 - nitro-o-toluate, 4,4′-dinitrobibenzyl-2,2′-dicarboxylate, 2-(4-nitrobenzyl)benzoate, 2-(2-nitrobenzyl)benzoate, 4-(4-nitrobenzyl)benzoate, 4 - nitrophenylacetate, 4-nitrohomophthalate, 4,4′ - dinitrodiphenylacetate, and 2,4-dinitrophenylacetate, derived from the acid and aryl and alkyl derivatives thereof, including the soluble barium, sodium, potassium, lithium, calcium, strontium, and the like, salt derivatives capable of forming a corresponding active nitrobenzyl carboxylate anion desensitizing material. The selection of such operable photopolymerization desensitizing compounds will necessarily vary with different photosensitive polymerizable compositions and accordingly, for best results and to render the desensitization effective in operable compositions, it will require some particularity in judgment determined primarily by the positive determinable polymerization desensitization results desired. For example, the desensitizing agents are found to be most suitable when added in the form of 5-nitro-o-toluic acid, 4,4′ - dinitrobibenzyl-2,2′-dicarboxylic acid, 2-(4-nitrobenzyl)benzoic acid, 2 - (2-nitrobenzyl)benzoic acid, 4-(4-nitrobenzyl)benzoic acid, 4-nitrophenylacetic acid, 4-nitrohomophthalic acid, 4,4′-dinitrodiphenylacetic acid, and 2,4-dinitrophenylacetic acid, including the soluble aryl and alkyl derivatives thereof and the soluble barium, sodium, potassium, lithium, calcium, strontium, zinc, silver, aluminum, and the like, salt derivatives thereof, capable of forming a corresponding active aromatic carboxylate ion containing one or more nitro groups and having the property of desensitizing photopolymerization of a photopolymerizable composition.

As indicated, it has been discovered that the desensitizing material, as herein provided, will not desensitize the light-sensitive compositions unless they are present in the light-sensitive photopolymer composition in the ionized state, that is, in the form of a nitrobenzyl moiety carboxylate anion, and accordingly are preferably added in the ionizable acid, acid derivative or soluble salt form. Therefore, it is necessary to the process of this invention that a suitable ion carrier medium be present, in the light-sensitive photopolymer composition, wherein such ionization can take place. In most instances, such a medium is preferably water. However, other suitable ion carrier materials which may be utilized in the compositions are glycerol, ethylene glycol, methanol, other short chain alcohols, dioxane, and the like. Such materials may be utilized the photosensitive composition in solution or in a film or supported film form. Appropriate thickeners and gelling agents, such as a suitable cellulosic material, gelatin, and the like, may also be present.

In general, the light-sensitive compositions containing one or more desensitizing agents of this invention are preferably prepared by bringing together (a) small amounts of the desensitizing agent and particularly a preferred desensitizing agent, (b) a polymerization catalyst system, and (c) a light-sensitive polymerizable monomer, preferably polymerizable vinyl monomers. Each of the components (a), (b) and (c) is preferably added to a medium such as a solution, before being admixed with the other components. Admixing of the components (a), (b) and (c) may be simultaneous or it may be any other order. For example, the polymerizable monomer component (c) may be initially added to a catalyst solution (b), preferably a photo-redox system as described in the aforementioned applications and illustrated herein, and the desensitizing agent (a) may be added later. Or, the polymerizable monomer may be combined with the desensitizing agent initially and the catalyst system may be added later. Furthermore, it is possible to add the desensitizing agent after the light-sensitive composition has been exposed, although this procedure does not lend itself to rapid printing and readout.

The desensitization process of the present invention is preferably carried out in a solution of the above components. The particular solvent employed will depend upon the solubility of the polymerizable monomer, of the components of the catalyst system, and desensitizing agent. Thus, if all the compounds are water soluble, such as in a system employing, for example, acrylamide as the vinyl monomer, thionine and sodium p-toluenesulfinate as the catalyst, and sodium 4-nitrophenylacetate as the desensitizing agent, an aqueous solution with the resultant composition containing water may be employed. Where a common solvent for the compounds is not available, different solvents, or mixtures thereof, which are miscible with each other may be employed. I have used as suitable solvents in the process of the present invention water, alcohols such as methanol, glycerol and ethylene glycol, and dioxane.

Dispersions may also be used in effecting the photopolymerization and desensitization. Resort to dispersions may be had where it is desirable to use an insoluble monomer or photosensitive initiator system. In general, however, I prefer not to use dispersions since the particulate matter tends to scatter the light or radiation used in the photopolymerization process. Furthermore, for the desensitization step, a dispersion cannot be directly made up because my desensitizing agent would remain in the non-ionized form. Rather, if a dispersion is to be used, a solution containing my desensitizing agent must first be made and then a dispersion can be made from this solution. This procedure permits my desensitizing agent to form anions while in solution so that subsequent light desensitization, as provided herein, can take place in the dispersion due to the already existing anions.

It is to be understood, however, that where an organic solvent system is used, it should serve as a carrying vehicle for the desensitizing ions, otherwise provision must be made for the presence in the system of a suitable vehicle therefor such as a small quantity of water. For example, I have found that a gel film composition of polymerizable monomers, light-activable polymerization catalyst and desensitizing agent containing water is adequate to allow efficient ionization of my desensitizing agent. The water may be added as such or may be supplied by incorporating in the reaction mixture a humectant such as ethylene glycol, glycerine, and mixtures of the same, or the like. When these substances are present, say in an amount of a few percent by weight of the mixture, they contain sufficient water, inherently present or probably absorbed from the atmosphere, to permit desensitization to proceed.

The pH of my photosensitive composition depends upon balancing the sometimes conflicting factors which affect both the polymerization and desensitization reactions. I have found that any desensitizing agent works best in a photosensitive composition having a pH between about 4 and about 9. However, pH's as high as about 12 and as low as about 3 may be employed with satisfactory results. Where permanent fixing is to be effected by heating, the pH of the mixture is controlled between about 3 to about 8, inclusive, and subsequently heated as provided in the Miller et al. application, or otherwise fixed by the addition of a soluble silver compound and heating as provided in the above Rust application.

To more specifically illustrate with non-limiting examples which are indicative of the various ways in which the principles of my discovery, invention or improvement may be employed to the accomplishment of the foregoing and related ends, the following description is provided.

The preferred polymerizable components utilizable in my invention are the vinyl monomers. The term "vinyl monomer" includes light polymerizable ethylenically unsaturated comparable compounds, as vinylidene monomers ($CH_2=CY_2$), fluorocarbon monomers, and the like. Examples of vinyl monomers are butadiene, vinyl chloride, vinylidene chloride, vinyl methyl ether, vinyl butyl ether, vinyl butyrate, styrene, vinyl benzoate, methyl methacrylate, acrylic acid, acrylonitrile, acrylamide, calcium diacrylate, barium dimethacrylate, and the like.

The amount of vinyl monomer in the reaction medium can vary within extremely wide limits. On the one hand, the amount of monomer employed may be the maximum solubility of the particular monomer in a particular solvent. On the other hand, the monomer may be present in small molar concentrations of the order of $10^{-2}$ or $10^{-3}$ molar. In general, it is preferable to use relatively high monomer concentrations (greater than about $2.5 \times 10^{-3}$ molar) because it has been found that the rate of photopolymerization materially decreases at lower monomer concentrations. Hereinafter, the term "moles per liter" and "molar" will be used to designate component concentrations relative to the total volume of photosensitive composition.

It is highly desirable to utilize monomers having a functionality greater than two, so that highly cross-linked polymers which are insoluble and infusible are obtained at a low degree of conversion. It is known that the greater the functionality of a monomer, the lower the degree of conversion at the gel point (or the point at which insolubility of the polymer sets in). This being the case, a discernible photographic image is obtainable by the process of the present invention at low light levels and in short periods of time when monomers of high functionality are employed.

Examples of vinyl monomers having a functionality greater than two and utilizable in the process of this invention are: calcium diacrylate, barium diacrylate, N,N'-methylenebisacrylamide, N - methyldiacrylylamide, tri-(methacrylyl)amide, triallyl cyanurate, divinylbenzene, divinyl ketones, diethyleneglycol diacrylate, and the like.

The cross-linking agent may be used alone or in conjunction with one or more monomers having a functionality of two or more. Where the latter combination is used, the cross-linking agent is generally employed in an amount ranging from 10 to 50 parts of the polyfunctional monomer to one part of cross-linking agent. As used herein and in the claims, the term "vinyl monomer" includes bifunctional vinyl monomers, polyfunctional vinyl monomers and combinations of both.

The preferred photo-redox catalyst systems used in the practical process of this invention comprise (1) a photo-oxidant capable of being raised to a photoactive level by the absorption of light having wavelengths lying in the wavelength region between about 4000 A. and about 7200 A. and capable when at this photoactive level of removing an electron from (2) a reducing agent or a catalyst to form a free radical capable of initiating polymerization of the vinyl monomer.

The photo-oxidant, or light-activable polymerization initiator, used herein must be capable of being raised to the particular photoactive level as herein provided and must also be capable of reacting with the desensitizing agents of this invention to produce a polymerization-inactive form of the photo-oxidant or light-activable polymerization initiator. Thus, some photo-oxidants or polymerization initiators which are suitable for rapid polymerization may be unsuitable for use in photosensitive compositions to be desensitized by the process of this invention and accordingly require some scientific selection in providing workable combinations of practical and determinable desensitization.

The desensitization effect of my desensitizing agents varies with the photo-oxidant or dye classes represented by the dyes in the photosensitive composition. Furthermore, such desensitization effect varies among the dyes within each dye class. The following dyes function as photooxidants in the photopolymerization step and can be utilized in photosensitive compositions which are to be desensitized by the herein described process: phenothiazine dyes such as thionine, methylene blue, azure A, azure B, azure C, methylene green, toluidine blue O, and new methylene blue N; isoalloxazine dyes such as riboflavin; phenazine dyes such as phenosafranine and safranine O; acridine dyes such as proflavine and acridine yellow; and xanthene dyes such as pyronine B. A preferred dye group, phenothazine dyes, are particularly useful in combination with the desensitizing material for an efficient practice of the disclosure herein. The desensitizing effect is slight or not prolonged when utilizing phenazine dyes such as safranine O and pyronine B; acridine dyes such as proflavine, acridine yellow and acridine orange; xanthene dyes such as fluorescein, rose bengal, erythrosin B, eosin B and phloxine B; and thiazole dyes such as thioflavin T. Therefore, such dyes are not preferred when prolonged, visually determinable desensitization of the photopolymerizable compositions is required.

The minimum required amount of photo-oxidant is approximately $10^{-7}$ moles per liter. As the concentration of the photo-oxidant is increased above this minimum concentration, the sensitivity of the photosensitive composition also increases; however, the sensitivity may pass through a maximum as the photo-oxidant concentration is further increased so that it may be desirable to avoid high concentrations ($10^{-2}$ moles per liter or more), especially when the photosensitive compositions to be polymerized is of greater thickness than a very thin film. However, since the optical properties of the photo-oxidant are dependent upon the quantities present as well as upon the intensity of the radiation employed, the criteria for determining the proper or practical quantities of photo-oxidant and of reducing agent to be employed will be governed by considerations other than just the amount needed for catalyzing the photopolymerization reaction.

The second component of the photo-redox catalyst system may be either a reducing agent as described in Oster Patent No. 3,097,097 or a catalyst as described in the copending patent applications of John B. Rust entitled "Photopolymers and the Process of Making Same," Serial No. 450,397, filed Apr. 23, 1965, and Serial No. 483,396, filed Aug. 31, 1965, both assigned to the instant assignee now abandoned and replaced by application Serial Nos. 824.902 and 824,903 respectively (hereafter designated as "Serial No. 450,397" and "Serial No. 483,396," respectively).

The reducing agents must be compatible with the herein described process of desensitization. As examples of prior art reducing agents, I may use 2,4-pentanedione, triethanolamine, thiourea, thiosinamine and hydrazine. Furthermore, ethylenediaminetetraacetic acid may be used as the reducing agent when the photo-oxidant employed is riboflavin.

If it is desired to employ a process of this invention in combination with a photosensitive composition which, when irradiated with visible light, is capable of rapid polymerization, the catalysts described in copending patent applications, Serial No. 450,397 and Serial No. 483,396, may be employed. As described therein, the catalysts include the aromatic and aliphatic organic sulfinic acids and certain derivatives thereof, triorgano-substituted phosphines and triorgano-substituted arsines. The catalysts therein described are incorporated herein by reference. The derivatives of the organic sulfinic acids which can be employed are sulfinyl halides, sulfinamides, salts and organic esters of the organic sulfinic acids, as well as adducts of sulfinic acids with carbonyl compounds and especially aldehydes.

Examples of the organic sulfinic acids and derivative compounds which function as electron donors and catalysts are: p-toluenesulfinic acid, benzenesulfinic acid, p-bromobenzenesulfinic acid, naphthalenesulfinic acid, para- or 4-acetamidobenzenesulfinic acid, 5-salicylsulfinic acid, ethanesulfinic acid, 1,4-butanedisulfinic acid, and α-toluenesulfinic acid. The salts of these acids may be any of the soluble salts which are compatible with the other components employed in the photosensitive solution and typically include the sodium, potassium, lithium, magnesium, calcium, barium, silver, zinc and aluminum salts. Appropriate esters of these acids typically include the methyl, ethyl, propyl, and butyl esters.

The sulfinyl halides include sulfinyl chlorides, for example, ethanesulfinyl chloride, and sulfinyl bromides, for example, benzenesulfinyl bromide, and the like. The sulfinamides include, for example, ethanesulfinamide; the N-alkylsulfinamides, such as N-methyl-p-toluenesulfinamide; and the N-arylsulfinamides, such as N-phenylbenzenesulfinamide. Aldehyde adducts of these sulfinic acids are, for example, the adducts formed with formaldehyde, acetaldehyde, isobutyraldehyde, heptaldehyde, and the like.

As the triorgano-substitued phosphine for use in the present invention, I may employ, for example, such appropriate phosphine compounds as: tributylphosphine, triphenylphosphine, dibutylphenylphosphine, methyldiphenylphosphine, and methylbutylphenylphosphine. Examples of appropriate triorgano-substituted arsine compounds are: triphenylarsine, methyldiphenylarsine, trioctylarsine, dibutylphenylarsine, and methylbutylphenylarsine.

Only catalytic amounts of the reducing agents and catalysts, or equivalent mixtures thereof, are needed in the photo-redox catalyst system for photopolymerization. Thus, photo-redox polymerization, according to the present invention, may be achieved by using concentrations of catalyst and reducing agent as small as $10^{-6}$ moles per liter. Hence, when measured against the quantity of the monomer, the amount of the catalyst or reducing agent can be exceedingly small. As an example, I have used one-tenth of a millimole of organic sulfinic compound catalyst per liter of solution to achieve a very satisfactory rate of photopolymerization. Higher concentrations, e.g., $10^{-2}$ molar, may result in somewhat accelerated rates of photopolymerization.

Riboflavin has previously been described as a photo-oxidant. However, riboflavin may be employed alone as the photo-redox catalyst system since riboflavin also exhibits reducing capabilities. Nevertheless, photopolymerization in the presence of riboflavin can be accelerated by the inclusion of ethylenediaminetetraacetic acid in the photosensitive composition.

Similarly, it is to be understood that not all of the possible combinations of dyes, catalysts, desensitizing agents, and monomers imaginable can work without the cooperative association of properties as set forth herein. For example, 4-(4'-nitrobenzyl)benzoic acid functions as a desensitizing agent with a photo-oxidant catalyst system and barium diacrylate as the monomer, whereas in a mixture of monomers, such as acrylamide and N,N'-methylenebisacrylamide in combination with the photo-oxidant, the same desensitizing agent gave insufficient desensitization for practical purposes in visual readout.

The concentration of my desensitizing material may vary from as low as about $1 \times 10^{-4}$ moles per liter to as high as the mutual solubility of the desensitizing material in the particular photosensitive composition. The lower limit is about $1 \times 10^{-4}$ moles per liter even with very low concentrations of the photo-oxidant, and it appears to be relatively independent of the identity of the dye employed herein.

Above the lower limit of about $1 \times 10^{-4}$ mols per liter, the concentration of my desensitizing agent will depend upon the amount of incident radiation ($\lambda_2$) which can be absorbed by it and upon the amount of photo-oxidant present in the light-sensitive composition. It has been found that the molar concentration of my desensitizing agent is preferably maintained above about twice the molar concentration of the photo-oxidant. To most efficiently use my desensitizing method and thus to provide rapid desensitization, the concentration of desensitizing agent should be maintained at a relatively high concentration (about $10^{-2}$ moles per liter). At the higher concentrations, greater energy absorption occurs to more rapidly activate the desensitizing material.

Desensitization by the process of this invention is a complex function of a number of interrelated variables such as the dye concentration, the desensitizing material concentration and the amount of ultraviolet light absorbed. Further, the optimum component concentrations and light intensities will be dependent upon the requirements of each application. Some of these interrelationships will be illustrated by the following specific data wherein barium diacrylate monomer was polymerized in the presence of a photo-redox catalyst system and a desensitizing material of the invention.

A series of aqueous photosensitive solutions was prepared by combining in each case 3.5 ml. of a barium diacrylate solution (containing 3.66 moles/liter of acrylate ion), 0.5 ml. of a 0.1 molar sodium p-toluenesulfinate solution, 0.5 ml. of a methylene blue solution, and 0.5 ml. of a barium 4-nitrophenylacetate solution, spread in thin film form and irradiated by invisible and visible light, as hereinafter described. The concentrations of the methylene blue stock solutions were determined by measuring the absorption of an appropriately diluted sample at the absorption peak of 6650 A. The original barium p-nitrophenylacetate stock solution had a pH of 6.9 and was found to contain 0.098 mole/liter of 4-nitrophenylacetate ion by means of its absorption in the ultraviolet. Other stock solutions of this reactant were prepared by means of appropriate dilutions with water.

In a practical application of the photosensitive resinous film compositions illustrated herein, it will be understood that the relative light transmission is correlated with a photographic image reproduction in light transparencies of thin resinous films in an analogous relationship to the production of negative prints and positive slides of conventional photography.

In the table (Table I) below are listed the concentrations of the dye and of 4-nitrophenylacetate and the ratios of 4-nitrophenylacetate to dye in each of the photosensitive solutions A–J.

TABLE I

| Solution: | Methylene blue concentration, moles/liter | 4-nitrophenyl-acetate ion concentration, moles/liter | Ratios |
|---|---|---|---|
| A | $5.6 \times 10^{-3}$ | $9.8 \times 10^{-3}$ | 1.75/1 |
| B | $1.0 \times 10^{-3}$ | $9.8 \times 10^{-3}$ | 9.8/1 |
| C | $1.0 \times 10^{-4}$ | $9.8 \times 10^{-3}$ | 98/1 |
| D | $1.0 \times 10^{-4}$ | $9.8 \times 10^{-4}$ | 9.8/1 |
| E | $1.0 \times 10^{-4}$ | $9.8 \times 10^{-5}$ | 0.98/1 |
| F | $1.0 \times 10^{-4}$ | $9.8 \times 10^{-6}$ | 0.098/1 |
| G | $1.0 \times 10^{-6}$ | $9.8 \times 10^{-3}$ | 9,800/1 |
| H | $1.0 \times 10^{-6}$ | $9.8 \times 10^{-4}$ | 980/1 |
| I | $1.0 \times 10^{-6}$ | $9.8 \times 10^{-5}$ | 98/1 |
| J | $1.0 \times 10^{-6}$ | $9.8 \times 10^{-6}$ | 9.8/1 |

Portions of the above solutions were placed between two glass plates separated at the periphery with plastic tape with a thickness of 7 mils. Each slide so prepared was irradiated first with ultraviolet light for a measured period of time and then irradiated with visible light immediately thereafter. Control samples were exposed to visible light without receiving any ultraviolet light.

By comparing the change in visible light transmission through thin resinous film material which has been initially exposed to ultraviolet light, i.e., fixed, with the change in visible light transmission of similar films which have not been exposed to utlraviolet light, the effectiveness of the desensitizing process of this invention can be illustrated.

Irradiation of the films or slides and control samples was accomplished by passing light from a 200 watt super high pressure mercury lamp known to the trade as PEK 200 through various filters. For irradiation with ultraviolet light, the beam from this lamp was passed through a light filter known to the trade as CS 7–54. For irradiation with visible light, the light was passed through a yellow light filter known to the trade as CS 3–69 and a neutral density filter having a transmittance of 0.10. These filters and a shutter were operated mechanically so that instantaneous changes could be made in the type of light used to irradiate the sample.

The changes in the relative transmittance of the test solutions were followed by means of a monitoring light beam passed through the spot being irradiated with light from the mercury lamp. The weak monitoring beam was first passed through conventional CS 4–72 and CS 3–72 light filters, and it had a negligible effect on polymerization of the sample.

The results are shown graphically in FIGS. 2–9, inclusive. Desensitization is indicated when, after ultraviolet irradiation, the solution required a longer exposure to visible light to achieve a certain decreased transmittance than the same solution required when it received no ultraviolet irradiation.

Referring now to FIGS. 2–9, more specifically, in Solution A (FIG. 2), although the desensitizing material concentration was substantially above a concentration of about $1 \times 10^{-4}$ moles/liter, this photosensitive composition was not effectively desensitized. By comparison, Solutions B, C, and G (FIGS. 3, 4 and 7) which contained the same amount of desensitizing material $9.8 \times 10^{-3}$ moles/liter) as Solution A were effectively desensitized. The primary difference between Solutions B, C and G and Solution A was the ratio of desensitizing material to dye (9.8:1, 9,800:1 and 1.75:1, respectively). On the other hand, even though the ratio of desensitizing material to dye may be substantially above about 2:1, the concentration of desensitizing material mey be too low to desensitize the photosensitive compositions. For example, insufficient practical desensitization of Solution I (FIG. 9) and Solution J was produced even though the ratios of the desensitizing material to dye were about 100:1 and about 10:1, respectively. As shown in Table I, the concentrations of the desensitizing material in Solution I and J were $9.8 \times 10^{-5}$ and $9.8 \times 10^{-6}$ moles/liter, respectively. By comparison, Solution D (FIG. 5) having a desensitizing material to dye ratio of about 10:1 and, more specifically, a desensitizing agent concentration of $9.8 \times 10^{-4}$ moles/liter was effectively desensitized.

From the foregoing, it appears that a minimum desensitizing agent concentration in this particular system exists at about $1 \times 10^{-4}$ moles/liter. Above about $1 \times 10^{-4}$ moles/liter, the desensitizing agent or material concentration is preferably maintained above about twice the photo-oxidant concentration.

As previously described, a photopolymer image is formed by exposing a photosensitive composition to light having wavelength $\lambda_1$ lying between about 3800 A. to at least about 7200 A. The resulting photosensitive photopolymer composition is then fixed by exposing this composition to radiation having wavelengths $\lambda_2$ which can be absorbed by my desensitizing agents to thereby form inhibitor intermediates. It has been found that my desensitizing agents absorb radiant energy having wavelengths lying in the region between about 2000 A. to about 4000 A. However, in general, they are characterized by absorption spectra which maximize at wavelengths of about 2850 A. Therefore, it is preferable to desensitize with radiant energy in the wavelengths region between about 2500 A. to about 4000 A. I have found that radiant energy from a mercury lamp at about 3660 A. produces highly satisfactory results. The area between 3800 A. and 4000 A. is a fringe or borderline of relative and overlapping energies requiring an exercise of judgment in application and use as is likewise necessary when utilizing radiation in xecess of 7200 A.

The time to exposure to the desensitizing radiation is optional and will depend upon the length of the desensitized period desired and upon the selective composition and amount of desensitizing material present. Thus, for desensitized periods of maximum length, the desensitizing exposure time to $\lambda_2$ radiation should be optimized, with the optimum period depending upon the particular composition being employed, as well as the background fog which one is willing to tolerate. The maximum allowable period during which the photosensitive photopolymer composition can be subjected to $\lambda_2$ radiation depends mainly upon the concentration of desensitizing material in the photosensitive composition. Because vinyl monomers, in general, can be polymerized, although slowly, by radiation in the ultraviolet region even in the absence of a catalyst, exposure of the photosensitive photopolymer composition to $\lambda_2$ radiation should be limited to the time required to convert the desensitizing material to the inhibitor intermediate form. While some desensitizing material is present in the photosensitive composition, substantially all of the $\lambda_2$ radiation is absorbed, thereby permitting insignificant amounts of polymerization of the vinyl monomer. However, when the desensitizing material has been coverted to the inhibitor intermediate form, continued exposure to $\lambda_2$ radiation produces significant polymerization of the vinyl monomer. Such further polymerization of the vinyl monomer greatly lessens the photopolymer image detail.

Figure 5:
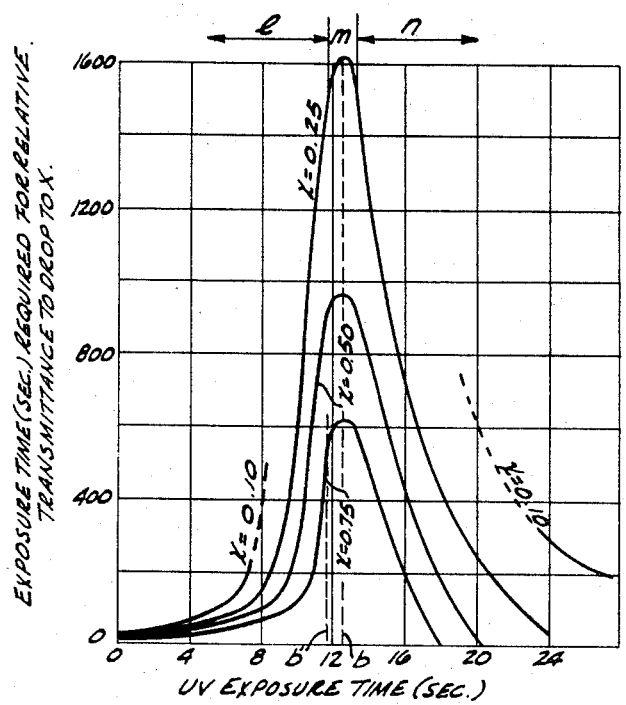
Figure 6:
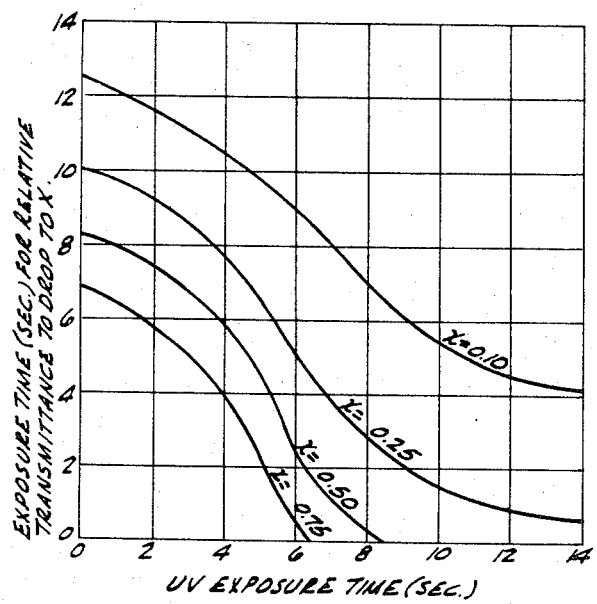

By reference to FIG. 5 will be recognized that if the polymerizable material is exposed to desensitizing radiation for the period of time corresponding to the peak of the curves (time $b$), the composition will be desensitized to its maximum or for the maximum period time of exposure. However, upon subsequent exposure to simultaneous polymerization radiation and polymerization inhibiting radiation, the optimum time of desensitization, while varying, dependent upon the composition, can fall just short of the peak which is then not necessarily the optimum time of desensitization.

The effect of overexposing to $\lambda_2$ radiation can be seen by reference to FIGS. 4, 5, 7 and 8, utilizing Solutions C, D, G and H, respectively. In general, the curves shown in these figures show an initial increase in desensitization, a peaking, and an apparent decrease in desensitization (for example, regions $l$, $m$ and $n$, respectively, in FIG. 5) as the exposure time to radiation increases. For practical purposes of explanation, it appears that at first substantially all of the $\lambda_2$ radiation is absorbed by the desensitizing material or agent to reduce the photo-oxidant to its inactive state. Very little or none of the absorbed $\lambda_2$ radiation causes polymerization of the vinyl monomer. As exposure to the $\lambda_2$ radiation increases, the amount of incident $\lambda_2$ radiation which is absorbed to cause polymerization of the vinyl monomer, and is probably absorbed by the vinyl monomer itself, increases. However, such polymerization of the vinyl monomer remains practically negligible in the $l$ region. The peaks (region $m$) in these curves represent the point at which polymerization of the vinyl monomer by $\lambda_2$ radiation first becomes significant. The decrease in ordinate values with increasing abscissa values in region $n$ is believed to be due to the increased polymerization of the vinyl monomer by $\lambda_2$ radiation during continued desensitizing exposure. This increase in the polymerization of the vinyl monomer by $\lambda_2$ radiation may be due to the photochemical conversion of the desensitizing agent to products, resulting in increased absorption of $\lambda_2$ radiation by the monomer itself to initiate polymerization. It may also be due to a slow polymerization of the monomer by the products derived photochemically from the desensitizing material. The reactions which initiate polymerization do not become significant until the photo-oxidant has all been reduced. Whatever the reasons may be, it has nevertheless been shown experimentally that excessive exposure to desensitizing radiation can cause polymerization, and consequently excessive desensitizing exposure should be avoided.

Although the period of inactivation of the photo-oxidant in this region (region $n$) is substantially in a reverse relationship approximately equal to the period of inactivation of the photo-oxidant approaching the peaking region (region $m$), thereby producing substantially equally long desensitization periods, the subsequent polymerization of the vinyl monomer by continued radiation in the $n$ region results in a gradual decrease in the time of the desensitized period. That is, inhibition of polymerization upon re-exposure to visible radiation ($\lambda_1$) is substantially identical in both the peaking ($m$) and post-peak ($n$) regions. However, after reaching the peak period, the polymerization, due to continued radiation with appropriate $\lambda_2$ in the post-peak region ($n$), makes it appear as though the desensitized compositions in the $n$ region are more photosensitive than those compositions in the peaking region ($m$). This is due to polymerization during the exposure to $\lambda_2$, however, and is not due to polymerization during subsequent viewing or projection with appropriate light of wavelength $\lambda_1$.

Thus, the effective desensitization period begins almost immediately upon exposure to invisible light and lasts for a positive period of up to about 15 minutes or more, dependent upon the composition, in visible light. Thereby, it will be recognized that an invisible image produced by desensitizing radiation impression $\lambda_2$ can be developed to form a visible image immediately in outstanding relationship by visible light or $\lambda_1$ radiation.

From the foregoing, it will be understood that no increase in desensitization can be accomplished after achieving an optimum level of the inhibitor intermediate, or after the desensitizing agent has been converted to the maximum inhibitor intermediate form. Furthermore, it will be understood that the $\lambda_2$ radiation can desensitize polymerization of the vinyl monomer and thereby produce image definition when the desensitizing material or agent is substantially converted to its inhibitor intermediate form in the $\lambda_2$ exposed portion of the polymerizable composition. While ideally, exposure should be for the optimum time which corresponds with the peaks on the curves at points $a$, $b$ and $c$, illustrated for example, in FIGS. 4, 5 and 7, it will be desirable in some instances to limit the initial or desensitizing period to a time less than the optimum time required to reach the ideal peaking region. Such time will depend upon the shape of the curve in the peaking region ($m$). For the photosensitive compositions C, D and G, points $a'$, $b'$ and $c'$ on curves for $x=0.5$ (FIGS. 4, 5 and 7, respectively) are representative of shortened desensitizing exposure times for producing satisfactory desensitized lives upon exposure to polymerization initiating radiation.

The preferred desensitizing exposure time will be determined from the following two factors. First, one must determine the amount of background polymerization which can be tolerated upon exposure to visible light. Secondly, the maximum desensitizing time at the determined background polymerization level will be determined as previously described. For example, in FIG. 4, the preferred desensitizing exposure time will be about five seconds if it is determined that the image can be sufficiently viewed until the relative transmittance of the background reaches 0.50, as illustrated by this composition. If it can be viewed until the transmittance of the background reaches 0.10, the optimum desensitizing exposure time will be about 14 seconds.

Figure 4:
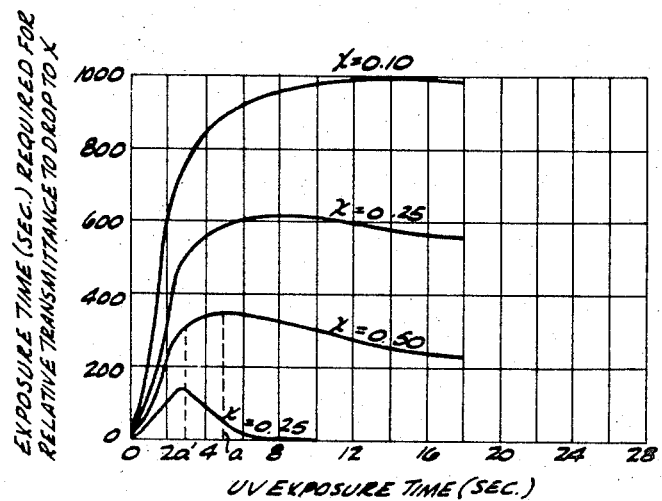
Figure 7:
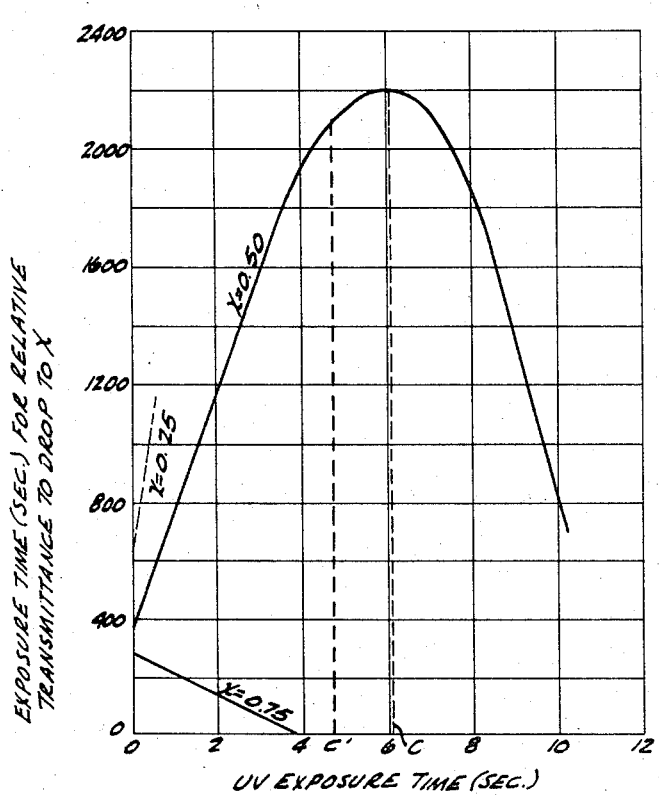
Figure 8:
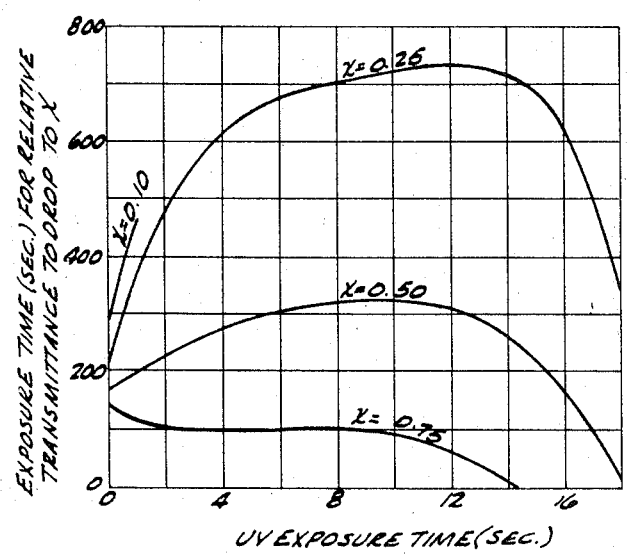
Figure 9:
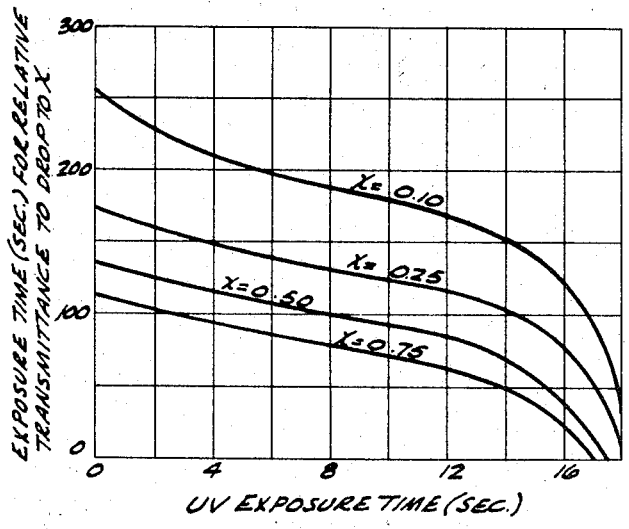

By stopping desensitization, at points represented by points $a'$, $b'$ and $c'$ in FIGS. 4, 5 and 7, substantially maximum or optimum desensitization will have been attained and very little polymerization of the vinyl monomer will occur during proper visible light exposure periods thereafter, lasting up to about fifteen minutes or more. Furthermore, the desensitized life of the photopolymer composition can be extended during readout projection of the photopolymer image by visible relation as visible light by the inherent presence of or including some invisible radiation as ultraviolet light in the visible light. The ultraviolet light in the visible light projection beam will produce some further desensitization (graphically represented by the reducing slope portions of the curves, for example, FIGS. 4, 5 and 7, between points $a'$, $b'$, and $c'$, and the peaks of such curves) during projection, thereby extending the desensitized life of the photopolymer composition. Otherwise, a small amount of desensitizing radiation in the projection beam serves to activate some unused desensitizing ion material during the time the composition would normally be recovering its photosensitivity. This slow, continuous desensitization serves to counteract the normal recovery of sensitivity upon exposure to visible light and during projection. Additionally, after controlled application of visible light, photopolymerization and recovery of the desensitizing material from its intermediate form, a further treatment with $\lambda_2$ radiation will again densensitize photopolymerization.

As shown in Example 4, a significant increase in the desensitized life of the photopolymer composition is produced by using a filter (CS 0–51) which transmits some ultraviolet light while projecting the photopolymer image onto a suitable surface, as compared with the use of filters opaque to ultraviolet during projection. To decrease the relative transmittance to a value of 0.50, required 132.2 seconds when using the CS 0–51 filter as compared with 77.4 88.2 and 92.8 seconds when using filters which did not transmit ultraviolet light and which had cuts at 5170, 4220 and 4130 A., respectively.

Inhibitors in the photosensitive compositions can inhibit both the photopolymerization reaction and the desensitization reaction. With respect to the desensitization reaction, it has been found that some inhibition occurs from the presence of, for example, oxygen in the photosensitive composition. However, this inhibitory effect is small. Rapid desensitization can be achieved without additional inhibitor removing steps. In practice significant amounts of inhibitor will be effectively removed from the photosensitive compositions by the image forming exposure, thereby decreasing inhibition of the desensitizing reactions.

As noted, inhibitors can also inhibit the photopolymerization reaction. Where prior art reducing agents are employed, inhibitors should be removed from the photosensitive compositions, as, for example, by removing oxygen under vacuum. However, if organic sulfinic catalysts are being used, rapid photopolymerization is still possible without removing the inhibitors although some benefit will be realized if they are removed.

The desensitizing agents of this invention (without being irradiated by $\lambda_2$ radiation) produce some inhibition of the photopolymerization reaction. However, it has been found that such inhibition is least significant under conditions most favorable to rapid polymerization. This is shown by the data of Table 2 which compares previously described Solutions C through J.

TABLE 2

| | Methylene blue, moles/liter | 4-nitrophenyl-acetate ion moles/liter | Time (sec.) of exposure to visible light required to achieve a relative transmittance of— | | | |
|---|---|---|---|---|---|---|
| | | | 0.75 | 0.50 | 0.25 | 0.10 |
| Solution: | | | | | | |
| C | $1.0 \times 10^{-4}$ | $9.8 \times 10^{-3}$ | 7.0 | 8.7 | 11.2 | 14.8 |
| D | $1.0 \times 10^{-4}$ | $9.8 \times 10^{-4}$ | 7.0 | 8.3 | 10.2 | 12.7 |
| E | $1.0 \times 10^{-4}$ | $9.8 \times 10^{-5}$ | 6.9 | 8.2 | 10.0 | 12.4 |
| F | $1.0 \times 10^{-4}$ | $9.8 \times 10^{-6}$ | 6.8 | 8.1 | 9.9 | 12.1 |
| G | $1.0 \times 10^{-6}$ | $9.8 \times 10^{-3}$ | 270 | 360 | 634 | ------ |
| H | $1.0 \times 10^{-6}$ | $9.8 \times 10^{-4}$ | 143 | 166 | 206 | 282 |
| I | $1.0 \times 10^{-6}$ | $9.8 \times 10^{-5}$ | 110 | 133 | 173 | 253 |
| J | $1.0 \times 10^{-6}$ | $9.8 \times 10^{-6}$ | 115 | 132 | 160 | 207 |

The data in Table 2 where derived from exposing photosensitive compositions containing varying amounts of desensitizing agent to visible light without prior exposure to ultraviolet light.

From Table 2, it can be seen that the most rapid photopolymerization compositions (containing $1.0 \times 10^{-4}$ moles/liter of dye) are practically unaffected by changes in desensitizing agent concentration. For example, when the desensitizing agent concentration is changed from $9.8 \times 10^{-3}$ moles per liter (Solution C) to $9.8 \times 10^{-6}$ moles per liter (Solution F), the time to reach a relative transmittance of 0.25 is decreased by only 1.3 seconds, i.e., a decrease of only about 11.6 percent. This is to be compared with the effect of the same changes in desensitizing agent concentration in a relatively slowly polymerizing photosensitive composition containing $1.0 \times 10^{-6}$ moles per liter of dye. For example, to achieve a relative transmittance of 0.25 as the desensitizing agent decreases from $9.8 \times 10^{-3}$ moles/liter (Solution G) to $9.8 \times 10^{-6}$ moles/liter (Solution J) requires 634 seconds and 160 seconds, respectively, i.e., a decrease of about 75 percent. Thus, it can be seen that in systems wherein this invention has its greatest utility (systems requiring both rapid photopolymerization and subsequent rapid desensitization), the photosensitive-inhibitory effect of my desensitizing agent is negligible.

As previously described, a complete photographic system incorporating the process of this invention requires the following three optical steps: (1) irradiation of the herein described photosensitive compositions with visible light having wavelengths lying between about 3800 A. and about 7200 A. to produce a photopolymer image; (2) exposure to radiation having wavelengths between about 2000 A. and about 4000 A. to temporarily desensitize the photopolymer composition; and (3) re-exposure to visible light for the purpose of viewing or projecting the desensitized photopolymer image on a suitable surface. This system results in the production of a negative image of the information desired to be recorded as a photopolymer image.

An even faster photographic process can be employed by first using the ultraviolet light to produce a latent image or replica in the photosensitive composition comprising numerous desensitized areas. Then, the photosensitive composition can be irradiated immediately to any time thereafter uniformly with visible light, first to develop the latent image and make it visible, then to project the polymer image on an appropriate surface. As the photosensitive composition is irradiated with visible light, the uninhibited portion of the photosensitive areas of the originally, totally photosensitive composition will polymerize to form opaque photopolymers surrounding the desensitized areas. In this manner a positive polymer image is formed with the background polymerized, as compared with the negative image formed by the three-step process.

In a modification of this process, visible light may be utilized during the induction period followed by impression of the image by invisible desensitizing radiation with subsequent viewing or projection of the image in visible light. The induction period is that interval of time normally required for polymerization to become observable when the composition is exposed to visible light.

The two-step process has the advantage of being faster and simpler than the three-step process because of the elimination of one step. Additionally, the image displayed by the two-step process is a positive copy of the initial object as compared with the negative image formed by the three-step process. Furthermore, because the inhibition reaction can be carried out much more rapidly than the photopolymerization reaction, light sources in the ultraviolet wavelength region having very short lives can be used to produce the image. For example, ultraviolet light from a flash lamp can be used in the imaging step with subsequent development and projection with visible light.

In addition to the above advantages over the three-step process, the two-step process has all the advantages of the three-step process as previously described. Thus, the two-step process produces an ultra-rapid, entirely optical data recording and readout system. While the time element of visibility is limited by subsequent polymerization in visible light, the advantage of permanently fixing the image which may otherwise become indistinguishable and completely disappear, is nevertheless possible as by control of pH and heating or addition of a soluble silver or like compound and heating, as heretofore indicated.

A comparison of the images produced by the two-step and three-step processes is shown in FIGS. 10a–10d. In FIG. 10, A represents a pattern to be projected as an image on to a photosensitive film B incorporating the process of this invention. The image on B is then projected on to a screen C for viewing. In each of A, B and C, the dark bands denote opaque areas or dark areas and the light bands denote transparent areas or lighted areas. In the following description the subscripts 3 and 2 denote the three-step and the two-step processes, respectively.

Figure 10A:
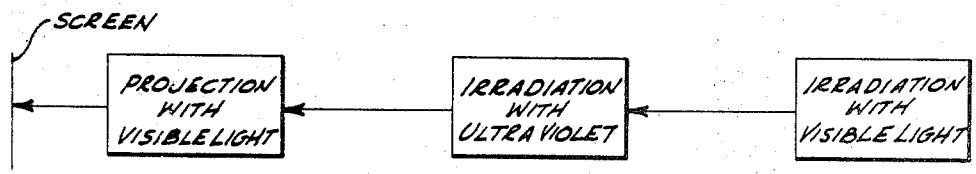
FIGS. 10a, 10b, 10c and 10d are pictorial representations of the steps of, and the particular results produced by, various optical methods of recording, desensitizing and projecting data employing the desensitizing process of this invention.
Figure 10B:
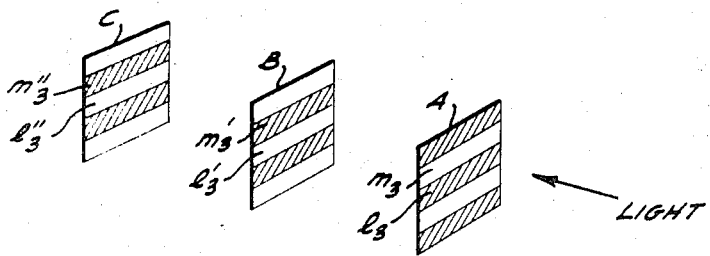

As shown in FIG. 10b, the opaque $l_3$ and transparent $m_3$ areas of the pattern A are projected by visible light on to the photosensitive film B forming the transparent $l_3'$ and opaque $m_3'$ areas, respectively. The photosensitive film B is then irradiated with ultraviolet light leaving the opaque and transparent areas in the film B undisturbed. Finally, the image is projected on the screen C with the opaque $m_3''$ and the transparent $l_3''$ areas in the same relative positions as in film B. Thus it can be seen that a negative image of the pattern A has been projected on to the screen C by employing three sequential exposures to alternating visible and ultraviolet light sources.

Figure 10C:
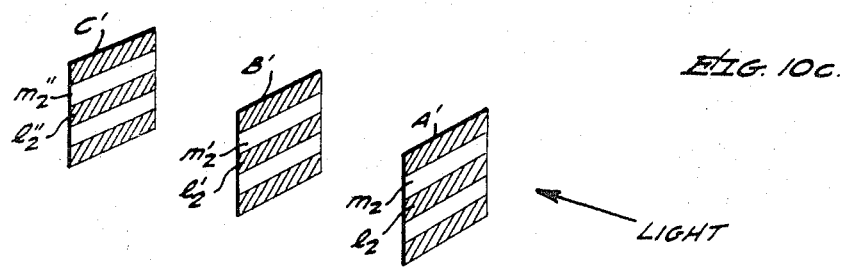
Figure 10D:
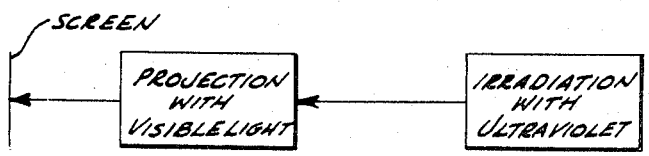

In the two-step process, exposure of the pattern A' to ultraviolet light, as illustrated in FIG. 10c, produces a desensitized area $m_2'$ on the film B' directly behind the transparent area $m_2$ on the pattern A'. The area $l_2'$ on the film B' directly behind the opaque area $l_2$ on the pattern B' remains photosensitive because the ultraviolet light cannot impinge at that point due to the blocking effect of the opaque area $l_2$ on the pattern B'. The film B' is then irradiated uniformly with visible light. At the photosensitive areas on the film B', such as at $l_2'$, photopolymerization takes place thereby blocking the visible light and throwing a dark spot $l_2''$ on the screen C'. The visible light passes through the desensitized areas $m_2'$ on the film and images on the screen C' at $m_2''$. Thus it will be seen that a positive image of the pattern A' has been produced on the screen C' by only two exposures—one ultraviolet and one visible.

It has been found that the darkness of the image formed in the two-step process depends upon the relative amount of incident ultraviolet light. In general, as the intensity of the incident ultraviolet light increases, the polymerization in the area of the photosensitive composition irradiated by such light when the photosensitive composition is later irradiated with visible light decreases. This results from increased insensitivity of the photosensitive composition to visible light in the areas irradiated by the relatively high intensity ultraviolet light. Thus, it will be understood that an image evidenced by varying degrees of darkness or greyness can be produced by the two-step process.

Figure 11:
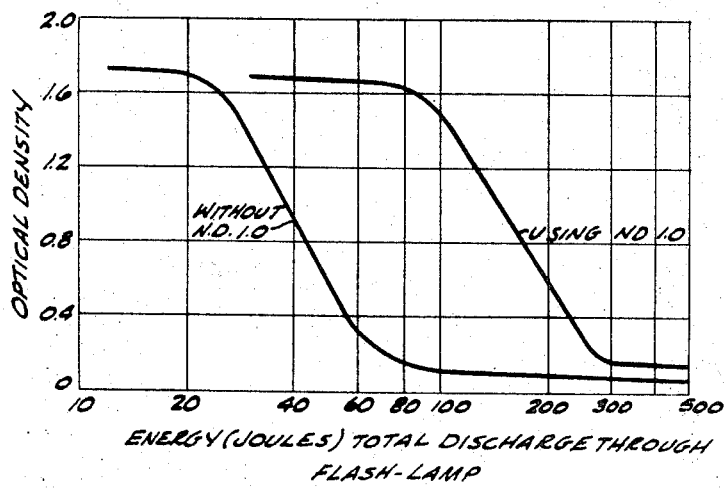
FIG. 11 is a graphical representation illustrating the increase in optical density of the herein described photosensitive compositions due to image-forming irradiation as a function of the energy of the light source used to irradiate such photosensitive compositions with light (both visible and invisible) in a prior desensitizing exposure.

This effect is graphically illustrated by Curves 1 and 2 of FIG. 11. The data of FIG. 11 were produced in the following manner. A photosensitive solution was made up containing 3.5 ml. of a barium diacrylate (2.2 molar barium diacrylate), 0.5 ml. of $1 \times 10^{-1}$ molar sodium p-toluene-sulfinate, 0.5 ml. of $1 \times 10^{-3}$ molar methylene blue and 0.5 ml. of 0.097 molar barium p-nitrophenylacetate, prepared as described with reference to Table 1. The pH of this solution was 5.6. A number of cells containing film portions of this photosensitive composition were made up, as described, and exposed to flashes at different energy levels from a Hemlite helical flash lamp No. YRH–79–66 employed as the ultraviolet source. The lamp potential was varied from 2.5 to 8.0K volts to give a flash duration of 0.15 millisecond. The incident light on one half the area of each cell was filtered by a neutral density 1.0 filter. Following ultraviolet exposure, the cells were exposed for ten seconds to light from PEK Labs No. 200–2 mercury lamp through a neutral density CS 3–74 filter.

The light transmission through the photosensitive composition was recorded and a plot of optical density versus energy of the ultraviolet flash was made as shown in FIG. 11. Values for the exposure to ultraviolet light as shown along the abscissa in FIG. 11 are strictly relative.

As shown by FIG. 11, the area receiving the most ultraviolet light (represented by Curve 1; no neutral density filter) was polymerized less than the area receiving the least ultraviolet light (Curve 2; neutral density filter) at the same energy levels. For example, at an energy level of 40 joules, an optical density of 0.92 was produced in the area most exposed to ultraviolet radiation whereas an optical density of 1.7 was produced in the area least exposed to ultraviolet light. From the foregoing, it will be seen that the optical density of previously ultraviolet-irradiated compositions, resulting from exposure to visible light, is a function of the amount of ultraviolet light absorbed by the photosensitive composition.

As shown by the curves in FIG. 11, there appears to be a short induction period during which naturally occurring inhibitors are initially consumed in the (ultraviolet) irradiation. By reference to the initial horizontal portions of the curves these inhibitors appear as being destroyed and no essential or appreciable difference in the photosensitive composition will be visually determinable if exposure is halted on this portion of the curves. In the final horizontal portions of the curves, the dye is essentially all reduced. The middle portions of the curves illustrate that the quantity of the dye (visible light photosensitive polymerization initiator) is a direct function of the invisible radiation (ultraviolet) exposure optically deactivating photopolymerization of the photosensitive composition. Thus, it will be understood that while the reactions are not necessarily instantaneous in a completely untreated new composition, the composition can be prepared therefor by optical conditioning in a very few milliseconds, as is described herein. Accordingly, some judgment in preparation, manipulation and operation of the techniques herein provdied are required.

As previously indicated, ultraviolet light sources of extremely short duration, e.g., a few milliseconds, can be used to produce a latent or subsequently developed positive image in a photopolymerizable photosensitive composition. Not only does this permit the use of ultraviolet sources having short lives, but it also permits the use of ultraviolet sources which emit some visible wavelengths. It has been found that when the herein described type of photosensitive compositions when irradiated with high intensity ultraviolet light for very short periods on the order of a few milliseconds, any visible wavelengths emitted by the ultraviolet source do not have to be filtered out. A good positive image will be formed despite the presence of some visible light. However, a more stable image will be formed if the visible wavelengths are filtered out. Example 14 illustrates the use of a high intensity, unfiltered source containing both ultraviolet and visible wavelengths.

As herein provided, the process of viewing a replica of the impression or polymer image is possible almost immediately after it is formed either by first exposure to invisible light and then visible light, simultaneous exposure to visible and invisible radiation, or first exposure to visible radiation, then treated with invisible radiation (invisible light) with subsequent visible radiation (visible light). In the overall processing, it will be recognized that either the relative image portion or the relative background portion of the photopolymerizable composition may be correspondingly desensitized by invisible radiation. Visible radiation polymerizes the relatively non-desensitized areas, as hereinafter exemplified and illustrated. That is, the photopolymerizable composition, in any event, will be correspondingly provided with relatively desensitized, unpolymerized areas and polymerized areas, whether illuminated alternatively or simultaneously with visible and invisible light from any direction, to obtain an optically viewable image reproduction in the partially polymerized photosensitive composition. For example, in reproducing a replica image, on an independent or supported transparent photosensitive film of photopolymerizable composition, a first impression with invisible radiation will desensitize background area adjacent to the non-desensitized image area. Thus, on subsequent illumination with visible light, the polymerization effected in the non-desensitized area makes the latent image in the image area visible. On the other hand, initial illumination of a reproducible replica with visible light effects an initial polymerization of background area beside a less polymerized adjacent image or replica area and then upon desensitizing photopolymerization by radiation deactivating photopolymerization renders the replica optically viewable for a period substantially without further polymerization, in whole or in part of the composition. In any instance, lighting and effects will be dependent upon the directions and orders of visible and invisible light exposures and the light intensities as provided by the operation.

As indicated, the process of subsequent illumination by visible light is temporary and lasts from about two to fifteen minutes or longer depending upon the amount of background polymerization which can be tolerated. Since it is often desirable to permanently desensitize at the point of optimum image reproduction, the photosensitive composition will preferably be of a controlled pH value or include a soluble silver halide desensitizing agent, as indicated, and heated to on the order of 80° C. or sufficient to effect permanent desensitization. Thus, the advantages of image reproduction, rapid viewing and permanent recording can be achieved, in normal light and with or without separation of the components of the polymerizable composition.

In effect, there are provided herein optical techniques utilizing photochemical reactions for producing and fixing an image reproduction in a photopolymerizable composition, under visible light conditions. The processing technique involves primarily control of photopolymerization with visible light (e.g., red or white light) in combination with temporarily inhibiting or fixing polymerization with invisible light (e.g., ultraviolet), with or without permanent fixation. As illustrated and described, this makes possible an optical image recording, in a photopolymerizable composition, using one light which may be a photosensitive desensitizing light and using a different light to activate photosensitive polymerization, with or without permanent fixation, under conditions of normal light. Otherwise, a representative image in the photosensitive composition can be effected by partial polymerization with visible light and the partial polymerization fixed by activating the inhibitor to deactivate photopolymerization, with or without permanent fixation, under conditions of normal light.

Illustratively, the photopolymer image formed during initial irradiation of the photosensitive composition in the three-step method and the photopolymerized background areas formed during the additional irradiation step in the two-step process is simplified when the photopolymer-forming irradiation and the desensitizing irradiation are directed at the photosensitive composition from the same angle, as illustrated. When this condition exists, the areas in the photosensitive composition directly behind the photopolymer mass are not affected by the desensitizing light. Therefore, these areas remain photosensitive. Amplification or clarification of the contrast of the background and replica image in the photopolymer composition is accomplished in either instance by further irradiating the photosensitive composition with visible light from any angle. The clarity or contrast is most rapid when the imaging light forming irradiation, by visible or invisible radiation, and the visible or amplifying light irradiation are positioned at opposite sides of the photopolymerizable composition and preferably in an angular relationship of 180° to each other. This later technique in the case of the three-step method causes the remaining photosensitive areas behind the photopolymer mass to polymerize and thereby increase the optical density of the initially impressed replica in the image areas of the photopolymer mass. In the more rapid two-step method or simultaneous application of invisible and visible radiation, the photoimpressed image becomes more pronounced and visually distinct, as between the background and impressed design during the development with a uniform exposure to visible light without any necessity for a separate amplification step.

The accomplishments of the foregoing description, objects and advantages will be recognized in conjunction with the following description wherein more explicit examples are given for purposes of illustration. To the accomplishment of the foregoing and related ends, this invention then comprises the features heretofore and hereinafter more fully described and inherent herein, and as particularly pointed out in the claims. Such illustrative embodiments are indicative of the various ways in which the principle of my discovery, invention or improvements may be employed.

EXAMPLE 1

This example illustrates the effects of irradiating a particular photosensitive composition with ultraviolet light for varying periods of time.

Solution A: Barium hydroxide octahydrate (315 g.) was added to distilled and recrystallized acrylic acid (144 g.) and water (150 ml.). The solution was stirred for one hour and additional barium hydroxide octahydrate (about 6.5 g.) was then added in small increments to adjust the pH to 6.6. A small quantity of insoluble material was removed by filtration.

Solution B: Sodium p-toluenesulfinate dihydrate (90+%, 2.14 g.) was dissolved in water (100 ml.).

Solution C: Methylene blue was dissolved in water to produce a solution with an absorbance of 83 at the maximum at 6650 A. Assuming an absorption coefficient of $8.7 \times 10^4$ for methylene blue, the concentration of the dye was calculated to be $9.5 \times 10^{-4}$ moles/liter.

Solution D: 4-nitrohomophthalic acid was dissolved in water with sufficient barium hydroxide added to produce a solution of barium 4-nitrohomophthalate having a pH of 11. A small quantity of hydrochloric acid was added to lower the pH to 5.6, and the concentration of the 4-nitrohomophthalate ion was determined from the ultraviolet absorption spectrum to be 0.011 molar.

Solution E: A photosensitive solution was prepared by combining Solution A (3.5 ml.), Solution B (0.5 ml.), Solution C (0.5 ml.), and Solution D (0.5 ml.).

Portions of Solution E were placed between two glass plates separated at the periphery by plastic tape with a thickness of 7 mils. Experimental films (slides) so prepared were irradiated with light from a 200-watt super high pressure mercury lamp. For irradiation with ultraviolet light, the beam from this lamp was passed through a conventional ultraviolet light filter known to the trade as CS 7-54. For irradiation with visible light, the light was passed through a conventional yellow filter known to the trade as CS 3-69 and a neutral density filter having a transmittance of 0.10. The change in transmittance of the test solution was followed by means of a monitoring light beam passed through the spot being irradiated with light from the mercury lamp. The weak monitoring beam was first passed through two conventional light filters known to the trade as CS 4-72 filter and CS 3-72 filter, and it had a negligible effect on polymerization of the sample. Each sample was first irradiated with ultraviolet light for a measured period of time, then irradiated with visible light thirty seconds later. The rate of polymerization, as evidenced by changes in the transmission, was compared with that of a sample which received no ultraviolet light. The results are shown in Table 3 below:

TABLE 3

| Period of irradiation with ultraviolet light, sec. | Relative transmittance after ultraviolet irradiation | Time (sec.) required for relative transmittance to decrease to— | | |
|---|---|---|---|---|
| | | 0.50 | 0.25 | 0.10 |
| None | | 5.3 | 6.7 | 8.7 |
| 2.0 | ~1.00 | 66.0 | 207.0 | 456.0 |
| 3.1 | ~1.00 | 803 | 1,179 | 1,506 |
| 3.8 | ~1.00 | 902 | 1,330 | 1,852 |

As can be seen from Table 3, only short periods of irradiation with ultraviolet light are needed to desensitize photosensitive compositions containing my desensitizing agents for substantially longer periods than when the same compositions are not irradiated with ultraviolet light.

By preparing another like film of the above composition, impressing a photograph image thereon by invisible (utlarviolet) radiation, then irradiating with visible light to optimum clarity and heating the film to about 80° C., fixed the polymer image to further irradiate with visible light.

EXAMPLE 2

This example illustrates the effect of a desensitizing agent differing from that used in Example 1 on the otherwise identical photosensitive compositions of Example 1.

Solutions A, B, and C: These solutions were the same as Solutions A, B, and C of Example 1.

Solution D: 4-nitrophenylacetic acid (about 1.8 g.) was dissolved in water, and barium hydroxide was added to neutralize the acid. After dilution to about 100 ml. with water, the solution had a pH of 5.6. The concentration of the p-nitrophenylacetate ion was determined from the ultraviolet absorption spectrum to be 0.096 molar.

Solution E: A photosensitive solution was prepared by combining Solution A (3.5 ml.), Solution B (0.5 ml.), Solution C (0.5 ml.), and Solution D (0.5 ml.).

The polymerization and desensitization of Solution E were investigated by the method described in Example 1. The results are shown in Table 4.

TABLE 4

| Period of irradiation with ultraviolet light, sec. | Relative transmittance after ultraviolet irradiation, percent | Time (sec.) required for relative transmittance to decrease to— | | |
|---|---|---|---|---|
| | | 0.50 | 0.25 | 0.10 |
| None | | 5.8 | 7.6 | 9.5 |
| 3.7 | 80.5 | 202.6 | 375.4 | 558.3 |

EXAMPLE 3

This example further illustrates the desensitization of a particular photosensitive composition by the process of this invention. Additionally, it illustrates the advantage derived by irradiating with ultraviolet light in increments rather than for a time equal to the sum of the increments.

Solution A: This solution was the same as Solution A of Example 1.

Solution B: 4-nitrohomophthalic acid (2.44 g.), sodium p-toluenesulfinate dihydrate (90+%, 2.14 g.), thionine (0.0122 g.), and methylene blue (0.107 g.) were dissolved in glycerol, and in sodium hydroxide (about 21 ml.) was added to neutralize the acid. Glycerol was added to make a total volume of 100 ml. of solution with a pH of 7.4.

Solution C: Solution A (3.5 ml.) was mixed with Solution B (0.5) to produce a photosensitive Solution C.

Portions of Solution C were irradiated with ultraviolet light followed by visible light thirty seconds later as described in Example 1. The effect of this irradiation was determined by monitoring the transmittance of the sample with a beam of blue light which itself had a negligible effect on the sample. The results are given below in Table 5.

TABLE 5

| Period of irradiation with ultraviolet light, sec. | Relative transmittance after ultraviolet irradiation | Time (sec.) required for relative transmittance to decrease to— | | |
|---|---|---|---|---|
| | | 0.50 | 0.25 | 0.10 |
| None | | 3.7 | 5.7 | 8.5 |
| 4.0 | 1.00 | 222.0 | 248.2 | 270.5 |
| 5.9 | 0.99 | 242.2 | 274.1 | 300.2 |
| 12.0 | 0.90 | 319.0 | 371.5 | 415.3 |
| 4.0 | ~1.00 | 205(0.725) | | |
| 3.6 | 0.465 | | 494(0.32) | |
| 4.9 | 0.18 | | | 820.6(0.10) |

One portion of Solution C was irradiated first with ultraviolet light for 4.0 sec. with no attending decrease in transmittance. It was then illuminated with visible light, and after 205 sec. of this illumination the relative transmittance was 0.725. An additional 3.6 sec. of ultraviolet light was accompanied by an immediate decrease in relative transmittance to 0.465, but then the relative transmittance decreased more slowly than it would have without the additional ultraviolet exposure. After a total exposure of 494 sec. to visible light, when the relative transmittance had dropped to 0.32, the sample was irradiated with ultraviolet light for 4.9 sec. Although the relative transmittance dropped to 0.18 as an immediate result of this exposure, a total of 820.6 sec. of visible illumination was required for the relative transmittance to decrease to 0.10.

From the foregoing, it will be seen that the photosensitive composition remained desensitized for substantially longer periods when irradiated with ultraviolet light in increments as compared with an irradiation time equal to the sum of the increments. The incremental method of ultraviolet irradiation is particularly useful where substantial polymerization of the background can be tolerated.

EXAMPLE 4

This example illustrates the effect on the desensitized life of employing image-projecting light having varying wavelength ranges and further illustrates the advantages to be gained by using projecting light containing some ultraviolet light.

Solution A: Lead monoxide (litharge, 2.23 g.) was dissolved in acrylic acid (14 g.) and water (5 ml.), and barium hydroxide octahydrate (28.35 g.) was added. The pH of the resulting solution was adjusted to about 6.5 by appropriate additions of small quantities of acrylic acid and barium hydroxide. The solution was concentrated by evaporation and filtered. It was analyzed and found to contain 0.00634 mole of double bond and 0.00266 mole of barium ion per milliliter.

Solutions B and C: These solutions were the same as Solutions B and C in Example 1.

Solution D: This solution was the same as Solution D in Example 2.

Solution E: A photosensitive test solution was prepared by combining Solution A (3.5 ml.), Solution B (0.5 ml.), Solution C (0.5 ml.), and Solution D (0.5 ml.).

Portions of Solution E were irradiated with ultraviolet light followed by visible light thirty seconds later as described in Example 1. The nature of the visible light was varied from sample to sample, however, by varying the glass color filter in the light beam. The glass color filters were conventional light filters known to the trade as CS 3–69; CS 3–73; CS 3–74, and CS 0–51. They differ in that their absorption is shifted to shorter wavelengths in the above order. The effect of this irradiation was determined by monitoring the transmittance of the sample with a weak beam of blue light which itself had a negligible effect on the sample. The results are given in Table 6 below, along with the wavelength of light at which the transmittance of the filter was 0.37. (This wavelength is known as the "cut.")

TABLE 6

| Period of irradiation with ultra-violet light, sec. | Glass color filter in visible light beam | Cut of glass color filter, A. | Time (sec.) of visible illumination required for relative transmittance to decrease to— | | |
|---|---|---|---|---|---|
| | | | 0.25 | 0.25 | 0.10 |
| None | CS 3-69 | 5,170 | 5.6 | 6.7 | 8.3 |
| 4.0 | CS 3-69 | 5,170 | 77.4 | 129.7 | 181.1 |
| 4.0 | CS 3-73 | 4,220 | 88.2 | 143 | 178.4 |
| 4.0 | CS 3-74 | 4,130 | 92.8 | 143.8 | 190.8 |
| 4.1 | CS 0-51 | 3,840 | 132.2 | 225.8 | 348.0 |

The conventional filter CS 0–51 transmits some ultraviolet light as well as visible light. Inclusion of some ultraviolet light with the visible light enables the sample to withstand the visible light for a longer period of time for a given decrease in relative transmittance.

EXAMPLE 5

This example illustrates the use of white light to polymerize the vinyl monomer and the use of ultraviolet light to densensitize the light-sensitive photopolymer composition.

An aqueous solution containing the following components was made:

10 ml. of an aqueous solution of pH buffer containing 40% acrylamide, 6% N,N'-methylenebisacrylamide, and $1 \times 10^{-4}$ molar in methylene blue;
1 ml. of 0.1 molar p-toluenesufinic acid sodium salt; and
1 ml. of 0.1 molar sodium 4-nitrophenylacetate solution.

This aqueous solution was mixed and divided into two equal fractions.

One fraction was exposed to visible light whereupon it polymerized immediately. The second fraction was exposed to ultraviolet light and it decolorized without polymerization. The second fraction was then exposed to visible light but no polymerization was detected thereby indicating that the second fraction was desensitized by exposure to ultraviolet light.

EXAMPLE 6

This example illustrates the use of red lights to photopolymerize the vinyl monomer, followed by exposure to ultraviolet light to densitize the light-sensitive photopolymer composition.

An aqueous solution was made up consisting of:

5 ml. of 48.9% barium diacrylate in water (pH 8);
5 ml. of glycerol solution 0.1 molar in p-toluenesulfinic acid sodium salt and $10^{-3}$ molar in thionine; and
0.5 ml. of 0.1 molar sodium 4-nitrophenylacetate solution.

The aqueous solution was mixed and placed in a slide made from 3.25 inch by 4.0 inch glass plates with a 0.2 millimeter spacer between them.

A resolution test pattern was projected onto the slide using red light from a monochromator. The red light had a wavelength of about 6060 A. Exposure was continued until an opaque photopolymer image of the test pattern was produced. The slide was then exposed to ultraviolet light from a filtered mercury arc to fix the photopolymer image. The image was viewed by exposing the slide to visible light from a 750-watt projector for about five minutes. During this period the projected image was quite legible.

When the same test was performed without the exposure to ultraviolet light, the entire slide rapidly became opaque in room light without exposing the slide to the 750-watt light source.

EXAMPLE 7

This example illustrates the rapidity with which a pattern can be recorded on a photosensitive film and projected onto a screen when using the herein described two-step process.

A glass cover photo cell was filled with a photosensitive solution containing a polymerizable monomer, a photoredox catalyst system and a desensitizing agent as described herein: The solution was made up by mixing 4.5 ml. of barium diacrylate solution (2.2 molar in barium ion, 4.6 molar in acrylate ion, and a pH of 6.6) with 0.5 ml. of photo-catalyst solution (0.09 molar in sodium 4-nitrophenylacetate, 0.09 molar in sodium p-toluenesulfinate, and $2.4 \times 10^{-3}$ molar in methylene blue, in a solution about 90% glycerol and 10% water by volume). The cell was made from two 2" x 2" cover glasses with a spacer 0.15 mm. thick between them, corresponding to the path length of the solution when the cell was filled.

A 40 millisecond exposure was made with an ultraviolet image (a test pattern) focused on the solution. This was followed immediately by projection with visible light to give a positive image of the test pattern on a screen. Both the ultraviolet and projection exposures were made using a 200-watt compact mercury arc. The ultraviolet exposure was for a period of only 40 milliseconds through an ultraviolet filter (CS 7–54) and a test pattern transparency (a silver halide positive on a glass plate). Then a yellow light filter (CS 2–72) dropped in position, and the ultraviolet filter and test pattern transparency dropped out of position, allowing projection of the new image formed as the visible light polymerized the uninhibited regions of the solution in the cell.

The total time required to form the latent image, develop it and view it under projection was about one second.

Accordingly, it will be recognized that imaging by photochemical inhibition of polymerization effects a latent image production in the photopolymerizable composition, which image is then developed by flooding the media with visible light, such as in a projector. Such addition of light then activating polymerization causes normal polymerization, except in the inhibited region to produce an opaque background while the inhibited area, or areas, remains transparent.

EXAMPLE 8

This example illustrates the ability of my desensitizing agents to desensitize photosensitive compositions containing a wide variety of dye compounds when the photosensitive compositions are irradiated with ultraviolet light.

The following solutions were made up:

Solution A: Distilled and recrystallized acrylic acid (144 g.) was added to a mixture of barium hydroxide octahydrate (315 g.) and water (250 ml.). The mixture was stirred to complete the reaction and was allowed to stand overnight. The supernant liquid was then decanted from some crystals which formed while standing, and the pH was adjusted to 6.8 by the appropriate addition of small quantities of acrylic acid and barium hydroxide. The concentration of barium ion in the final solution was shown by analysis to be 2.10 moles/liter.

Solution B: A solution of barium diacrylate was prepared by adding 229 g. of distilled acrylic acid to a slurry of 473.2 g. of barium hydroxide octahydrate in 375 ml. of water. The solution was stirred for one hour and a small additional quantity of barium hydroxide was added to adjust the pH to 6.7. After standing overnight, the solution was filtered to remove a small quantity of insoluble material. An analysis for barium ion revealed a concentration of 1.83 moles/liter.

Solution C: Sodium p - toluenesulfinate dihydrate (90+%, 2.14 g.) was dissolved in deionized water (100 ml.).

Solution D: 4-nitrophenylacetic acid was dissolved in water containing sufficient barium hydroxide to bring the final pH to 6.9. The concentration of the p-nitrophenylacetate ion was determined from the ultraviolet absorption to be 0.098 mole/liter.

Photosensitive solutions were prepared by mixing 3.5 ml. of a monomer solution (either Solution A or Solution B), 0.5 ml. of Solution C, 0.5 ml. of Solution D, and 0.5 ml. of one of a series of aqueous dye solutions shown in Table 7. Portions of these photosensitive solutions were placed between two glass plates separated at the periphery by plastic tape with a thickness of 7 mils.

The slides which were prepared in this manner were irradiated with light from a 200-watt super high pressure mercury lamp known to the trade as PEK 200. Appropriate filters were placed in the light beam so as to transmit either visible or ultraviolet light as desired and to absorb or reflect the light of undesirable wavelengths.

Polymerization was detected by means of changes in the transmittance of the solution. A weak monitoring light beam, which had a negligible effect on polymerization of the sample, was passed through the spot being irradiated in order to follow the changes in transmittance. A portion of each solution was irradiated with visible light only, and the time required for the transmitted light to decrease by a given fraction was noted. A second portion of the same solution was then irradiated with ultraviolet light followed immediately by visible light. The visible exposure required for the transmission to decrease by the same fraction was again noted. Desensitization was observed when the photopolymerization was slower after the solution was exposed to ultraviolet light than it was without any ultraviolet exposure.

The results are given in Table 7 below in conjunction with the monomer and dye solutions employed.

TABLE 7

| Monomer solution | Dye | Concentration of dye solution g./100 ml. | Ultraviolet transmission filter | Visible transmission filter(s) | Ultraviolet exposure, sec. | Visible exposure required for relative transmission to drop to X | X |
|---|---|---|---|---|---|---|---|
| A | Methylene blue | (9.9×10⁻⁴M) | CS 3-69+ND1 | CS 3-69+ND1 | (¹) / 0.2 | 5 / 39 | 0.50 / 0.50 |
| A | Azure A | 0.033 | CS 3-69+ND1 | CS 3-69+ND1 | (¹) / 0.2 | 6 / 42 | 0.50 / 0.50 |
| A | Azure B | 0.031 | CS 3-69+ND1 | CS 3-69+ND1 | (¹) / 0.2 | 5 / 35 | 0.50 / 0.50 |
| A | Azure C | 0.032 | CS 3-69+ND1 | CS 3-69+ND1 | (¹) / 0.2 | 4 / 24 | 0.50 / 0.50 |
| A | Thionine | 0.027 | CS 3-69+ND1 | CS 3-69+ND1 | (¹) / 0.2 | 3 / 31 | 0.50 / 0.50 |
| A | Methylene green | 0.030 | CS 3-69+ND1 | CS 3-69+ND1 | (¹) / 0.2 | 20 / 96 | 0.50 / 0.50 |
| A | Toluidine blue O | 0.032 | CS 3-69+ND1 | CS 3-69+ND1 | (¹) / 0.2 | 5 / 36 | 0.50 / 0.50 |
| A | New methylene blue N | 0.033 | CS 3-69+ND1 | CS 3-69+ND1 | (¹) / 0.2 | 9 / 43 | 0.50 / 0.50 |
| A | Acridine yellow | (²) | CS 3-69+ND1 | CS 0-51+ND1 | (¹) / 0.4 | 11 / 20 | 0.50 / 0.50 |
| B | Safranine O | 0.032 | CS 7-54 | CS 0-51+ND1 | (¹) / 0.25 | 14 / 44 | 0.90 / 0.90 |
| B | Methylene blue | (9.8+10⁻⁴M) | CS 7-54 | CS 3-69+ND1 | (¹) / 0.2 | 7 / 70 | 0.50 / 0.50 |
| B | Riboflavin | 0.080 | CS 7-54 | *436 I.F. | (¹) / 2 | 13 / 66 | 0.71 / 0.71 |
| B | Proflavine | 0.061 | CS 7-54 | *436 I.F. | (¹) / 2 | 6 | 0.5 / 0.5 |
| B | Pyronine B | 0.030 | CS 7-54 | CS 3-71+ND1 | (¹) / 2 | 537 / 600 | 0.90 / 0.90 |
| B | Phenosafranine | 0.029 | CS 7-60 | CS 3-72+ND1 | (¹) / 1.3 | 20 / 66 | 0.50 / 0.50 |
| B | Methylene blue plus phenosafranine | (4.9+10⁻⁴M) / 0.014 | CS 7-54 | CS 3-69+ND1 | (¹) / 2 | 13 / 58 | 0.50 / 0.50 |
| B | Methylene blue plus safranine O | (4.9+10⁻⁴M) / 0.016 | CS 7-54 | CS 3-69+ND1 | (¹) / 2 | 13 / 45 | 0.50 / 0.50 |
| B | Methylene blue plus acridine yellow | (4.9+10⁻⁴M) / (³) | CS 7-54 | CS 3-69+ND1 | (¹) / 2 | 25 / 234 | 0.50 / 0.50 |
| B | Methylene blue plus eriochrome cyanine R | (4.9+10⁻⁴M) / 0.047 | CS 7-54 | CS 3-69+ND1 | (¹) / 2 | 8 / 127 | 0.50 / 0.50 |

¹ None.
² Saturated solution.
³ ½ x saturated.

The ultraviolet transmitting filters CS 7–54 and CS 7–60 and the visible transmitting filters CS 3–69, CS 3–71, CS 3–72, and CS 0–51 listed above were conventional and known to the art. The filter identified in the table as ND1 was a neutral density filter with an optical density of 1.0, and filter #436 I.F. was an interference filter with maximum transmission at 4360 A.

used for photopolymerization was first passed through a conventional CS 3–69 color filter and a neutral density filter having an optical density of 1.0. The data given in Table 8 below demonstrate that each photosensitive composition, as identified by the catalyst solution used in its preparation, polymerized more slowly after being irradiated with ultraviolet light.

TABLE 8

| Catalyst | Concentration of catalyst solution, moles/liter | Exposure to ultraviolet light, sec. | Visible exposure required for relative transmittance to drop to X, sec. | Relative transmittance, X |
|---|---|---|---|---|
| Sodium p-toluenesulfinate | 0.10 | (¹) / 3 | 14 / 206 | 0.50 / 0.85 |
| Triethanolamine | 0.10 | (¹) / 3 | 491 / 510 | 0.83 / 0.97 |
| 2,4-pentanedione | 0.10 | (¹) / 2 | 24 / 175 | 0.50 / 0.71 |
| Thiosinamine | 0.10 | (¹) / 2 | 200 / 240 | 0.62 / 0.81 |
| Sodium benzenesulfinate | 0.10 | (¹) / 2 | 10 / 190 | 0.50 / 0.62 |
| 5-salicylsulfinic acid | 0.1 | (¹) / 2 | 11 / 250 | 0.50 / 0.70 |
| p-Acetamidobenzenesulfinic acid | 0.10 | (¹) / 2 | 13 / 262 | 0.50 / 0.54 |
| Hydrazine | 0.10 | (¹) / 2 | 247 / 280 | 0.50 / 0.99 |

¹ None.

EXAMPLE 9

This example illustrates that the invention is applicable to photopolymerizable compositions employing a wide variety of reducing agent.

Light-sensitive solutions were prepared by mixing 3.5 ml. of Solution B and 0.5 ml. of Solution D from Example 8 with 0.5 ml. of a 9.8×10⁻⁴ molar aqueous solution of methylene blue and 0.5 ml. of one of a series of aqueous catalyst solutions as shown in Table 8.

The rate of photopolymerization with and without prior exposure to ultraviolet light was observed in a manner similar to that described in Example 8. Ultraviolet irradiation was carried out with light passed through a conventional CS 7–54 glass color filter, while the visible light

EXAMPLE 10

This example illustrates the effect of salt of 2-(2'-nitrobenzyl)benzoic acid on the sensitivity of the photopolymer system of this invention to visible light when irradiated first with ultraviolet light for a short time.

A solution of barium diacrylate was prepared by adding 229 g. of distilled acrylic acid to a slurry of 473.2 g. of barium hydroxide octahydrate in 375 ml. of water. The solution was stirred for one hour with a small additional quantity of inert insoluble material, as diatomaceous earth, and filtered. An analysis for barium ion revealed a concentration of 1.83 moles/liter.

An aqueous photosensitive solution was prepared by combining 3.5 ml. of the above barium diacrylate solution, 0.5 ml. of a 0.1 molar sodium p-toluenesulfinate solution, 0.5 ml. of $1.0 \times 10^{-3}$ molar methylene blue solution, and 0.5 ml. of 0.09 molar sodium 2-(2'-nitrobenzyl) benzoated.

Portions of the above solution were placed between two glass plates separated at the periphery with electrical tape with a thickness of 7 mils. Experimental slides so prepared were irradiated with light from a PEK 200-watt super high pressure mercury lamp. For irradiation with ultraviolet light, the beam from this lamp was passed through a conventional CS 7–54 light filter. For irradiation with visible light, the light was passed through a yellow CS 3–69 light filter and a quartz neutral density filter having a transmittance of 0.10. These filters and a shutter were operated mechanically so that instantaneous changes could be made in the type of light used to irradiate the sample. The change in the relative transmittance of the test solution was followed by means of a monitoring light beam passed through the spot being irradiated with light from the mercury lamp. The weak monitoring beam was first passed through conventional CS 4–72 and CS 3–72 light filters, and it had a negligible effect on polymerization of the sample. The sample was irradiated first with ultraviolet light for a measured period of time and then irradiated with visible light immediately thereafter. A control sample was exposed to visible light without receiving any ultraviolet light.

Without prior ultraviolet irradiation, it took six seconds of visible light exposure to decrease the transmittance of the control sample by 50%. The sample which was first irradiated with ultraviolet light for two seconds, required 215 seconds of exposure to visible light to reach the same level of transmittance (50%).

The results thus show that sodium 2-(2'-nitrobenzyl) benzoate slows down significantly the polymerization rate of the solution by visible light if the photosensitive composition is first irradiated with ultraviolet light.

EXAMPLE 11

This example illustrates the ultra-rapid formation of a positive image by the two-step process of this invention in a transparent photosensitive film composition containing barium acrylate monomer.

A solution of barium diacrylate was prepared by adding 458 g. of distilled acrylic acid to a slurry of 906 g. barium hydroxide octahydrate in 650 ml. water. More barium hydroxide and acrylic acid were added to adjust the solution to pH 6.6. Diamtomaceous earth was added to the solution which contained insoluble particles and the mixture was filtered.

A photosensitive Solution A was prepared by combining 4.5 ml. of the above filtered barium diacrylate solution and 0.5 ml. of aqueous photo-catalyst solution which consisted of 0.10 molar sodium p-toluenesulfinate, 0.10 molar sodium 4-nitrophenylacetate, and $2.1 \times 10^{-3}$ molar methylene blue.

Portions of Solution A were placed between two glass plates separated at the periphery with 7 mils thick electrical tape. Experimental transparent films so prepared were placed into the cell holder which was positioned so that an image of the test pattern was in focus on the film when the image, a U.S.A.F. photo-etched nickel resolution test pattern, was projected by a focusing lens and passed through a quartz No. 1 lens thereto. Light from a PEK 200-watt super high pressure mercury lamp was used. For exposure with ultraviolet light the beam was passed through the test pattern and a conventional CS 7–54 light filter. The light was passed through a conventional CS 3–73 filter for the development and projection of the image with visible light.

The shutter, resolution test pattern, and the filters were operated in timed sequence as follows: the shutter dropped out of the light path, the pattern was exposed through the ultraviolet light filter for a preset time and then both test pattern and filter dropped out of the light path whereupon the filter for visible light projection dropped into position.

The results showed that a resolution of 22 to 25 lines/mm. was easily obtained when using an ultraviolet light exposure of 0.2 sec. to form an image which is about $7/10$ of the test pattern size. The limit of optical resolution for the projection of the test pattern alone was about 30 lines/mm. in this setup. About 0.8 sec. (.8 to 1.1 sec.) were required for the image to become well visible. The image lasted longer than five minutes on continued exposure to visible light. The above is representative of forming a latent or invisible image in the polymer film with subsequent resolution by visible light. Thus, there is provided a film of polymerizable resinous material containing a uniform mixture of polymerization catalyst with varying portions of light sensitivity. If desired, the resolution can be fixed by heating the film or including a soluble silver halide in the mixture, as indicated, and heating at the point of optimum resolution.

EXAMPLE 12

This example is similar to Example 11 except that here the solvent for the vinyl monomer, photo-redox catalyst system and desensitizing agent was a glycerol water solution as compared with the water solvent of Example 11.

A solution of barium diacrylate was prepared by adding 458 g. of distilled acrylic acid to a slurry of 906 g. barium hydroxide octahydrate in 650 ml. water. More barium hydroxide and acrylic acid were added to adjust the solution to pH 6.6. Diatomaceous earth was added to the solution which contained insoluble particles and the mixture was filtered.

A photosensitive Solution A was prepared by combining 4.5 ml. of the above barium diacrylate solution and 0.5 ml. of photo-catalyst which consisted of 0.09 molar sodium p-toluenesulfinate, 0.09 molar sodium 4-nitrophenylacetate, and $2.1 \times 10^{-3}$ molar methylene blue in a solution of 91% glycerol and 9% water by volume.

Portions of Solution A were placed between two glass plates and the slides so formed were then irradiated as described in Example 11.

The results showed that a resolution of 22 to 25 lines/mm. was obtained when using an ultraviolet light exposure of 0.2 sec. to obtain an image which is about $9/10$ of test pattern size. About 1.1 sec. were required for the image to become clearly visible and it lasted a few minutes.

Under exactly the same conditions, the test samples containing glycerol water photo-catalyst solution and aqueous photo-catalyst solution behaved in the same way. However, from qualitative observations, it appeared that the image in the glycerol water solution showed greater contrast than the image in the aqueous solution but the glycerol one seemed to have a shorter projection time.

EXAMPLE 13

This example illustrates the formation of an image reproduced in a photosensitive resinous film composition exposed to an ultraviolet source for only 45 milliseconds.

A photo-catalyst solution was made up as follows: 1.802 g. of p-nitrophenylacetic acid, 2.14 g. of the sodium salt of p-toluenesulfinic acid, and 0.1002 g. of methylene blue were admixed and diluted to a volume of 100 ml. by the addition of glycerol. To the resulting solution was added 10 ml. of 0.1 N sodium hydroxide solution. A photosensitive solution was made up by combining 4.5 ml. of a barium diacrylate solution, made as described in Example 12, with 0.5 ml. of the above photosensitive solution. This photosensitive solution was exposed to ultraviolet light from a PEK mercury lamp No. 200-2 through a conventional filter CS 7–54 and a test pattern. Exposure time was 45 milliseconds. Following ultraviolet exposure, the solution was exposed to visible light through a conventional CS 3–73 filter and a neutral density 1.0 filter.

The time for initiation of polymerization was 1.0 sec and the image lifetime was about two minutes.

EXAMPLE 14

This example illustrates the formation of a positive image in a photosensitive polymerizable resinous composition employing an unfiltered ultraviolet source, i.e., a light source containing both ultraviolet and visible wavelengths.

An aqueous photosensitive solution was made up containing 3.5 ml. of barium diacrylate, 0.5 ml. of $1 \times 10^{-1}$ molar sodium p-toluenesulfinate, 0.5 ml. of $1 \times 10^{-3}$ molar methylene blue and 0.5 ml. of 0.09 molar barium nitrophenylacetate. The pH of this solution was 5.6. The solution was exposed to an unfiltered flash through a glass resolution pattern using a conventional EGG–FX42 flash lamp as the ultraviolet source. Exposure time was 1.4 milliseconds.

The photosensitive composition was then exposed to visible light. The resulting image had a lifetime in ordinary room light of one to two hours.

As shown by the foregoing, I have disclosed novel methods of rapidly desensitizing photosensitive compositions containing a polymerizable monomer and a photosensitive catalyst, and preferably a photo-redox catalyst system, before or after various stages of polymerization. As described, the process of this invention preferably includes the steps of: (1) adding to photosensitive polymerizable compositions containing a light-sensitive polymerization catalyst a small amount of desensitizing agent inactive to visible light and activated by invisible radiation (preferably ultraviolet) to inhibit polymerization; (2) irradiating sad photosensitive compositions with a light pattern whose variations in intensity bear the form of an image and effecting polymerization to varying degrees in various portions of the polymerizable composition; (3) irradiating said photosensitive composition with radiant energy activating the inhibitor to deactivate photopolymerization and having wavelengths between about 2000 A. and about 4000 A. to thereby inhibit polymerization; and (4) resolving the images so formed with visible light in the wavelength range of from 3800 A. to 7200 A. As illustrated, the reproduced more pronounced image may be effected by first impressing on the polymerizable composition an imprint thereof with invisible radiation with subsequent development and resolution by visible radiation, or first impression with visible radiation followed by polymerization inhibiting radiation, or the simultaneous application of such visible and invisible radiation. While not preferred in the operation, for best results, the appearance of overlap is due to the art's knowledge of wavelengths of a high order of invisible radiation and low order of visible radiation in the ranges of about 3800 A. to 4000 A., which may be utilized to effect desensitization and polymerization in the practice of the methods discovered and disclosed herein.

Densitization by the process of this invention is extremely rapid as compared with any other known desensitizing method. As shown, viewing of a photopolymer image is possible within a few seconds after formation of such an image when desensitization is accomplished by the method of this invention. Additionally, the inhibitory effect of my desensitizing agents, themselves, on polymerization is not significant in the presence of photosensitive compositions capable of rapid photopolymerization. Furthermore, as shown herein, the desensitizing step of this invention is completely optical. The combination of these factors permits the assemblage of rapid, efficient, totally optical data viewing and recording systems, with or without permanent fixation of the photopolymer image, if desired.

While certain embodiments are disclosed herein, modifications which lie wthin the scope of this invention will occur to those skilled in the art. I intend to be bound only by the scope of the claims which follow.

What is claimed is:

1. A photopolymerizable composition comprising (A) a photopolymerizable ethylenically unsaturated monomer capable of polymerization by free radical initiated addition polymerization, (B) a photopolymerization initiator system, said system comprising (1) a photo-oxidant dye capable of being raised to a photoactive state by the absorption of radiation having wave-length between about 3800 A. to about 7200 A. and (2) a reducing agent for the said dye, or a catalyst for the said dye selected from the group consisting of (a) an aromatic or aliphatic sulfinic acid, or inorganic salts and organic esters thereof, sulfinic halides, sulfinamide and an adduct derived from the combination of an aromatic or aliphatic sulfinic acid with a carbonyl compound, (b) tri-organic aryl and alkyl substituted phosphines, and (c) tri-organic aryl and alkyl substituted arsines, and (C) an ionizable nitro group substituted aryl carboxylic acid compound or soluble salt thereof in an ionizing carrier medium which is capable of preventing the initiator system from polymerizing said monomer by a nitrobenzyl moiety carboxylate anion when irridiated with radiation in the wave-length range of about 2000 A. to about 4000 A.

2. The photopolymerizable composition of claim 1 wherein the photooxidant dye is a quinoidal dye.

3. The photopolymerizable composition of claim 1 wherein the photooxidant dye is selected from the group consisting of a phenothiazine dye, a isoalloxazine dye, a phenazine dye, an acridine dye, a thiazole dye, and a xanthene dye.

4. The photopolymerizable composition of claim 1 wherein said desensitizing material is selected from the group consisting of 5-nitro-o-toluic acid; 4,4'-dinitrobibenzyl-2,2'-dicarboxylic acid; 2-(4-nitrobenzyl)benzoic acid; 2-(2-nitrobenzyl)benzoic acid; 4-(4-nitrobenzyl)benzoic acid; 4-nitrophenylacetic acid; 4-nitrohomophthalic acid; 4,4'-dinitrodiphenylacetic acid; 2,4-dinitrophenylacetic acid, 3 carboxy 4-nitrophenylacetic acid; and 2-nitro-5-benzylbenzoic acid, including the soluble alkaryl, arylalkyl, aryl and alkyl derivatives thereof and the soluble barium, sodium, potassium, lithium, calcium, strontium, zinc, silver, and aluminum salt derivatives, and mixtures of said materials comprising compounds having a benzyl moiety containing one or more nitro groups and having the property of desensitizing the photopolymerization of the said photopolymerizable composition by said initiator combination when irradiated with ultraviolet light.

5. The photopolymerizable composition of claim 1 wherein said catalyst is employed and is selected from the group consisting of an organic sulfinic acid a sulfinyl halide, a sulfinamide, an inorganic salt of an organic sulfinic acid, an organic ester derivative of an organic sulfinic acid, and an adduct derived from the combination of an organic sulfinic acid with a carbonyl compound.

6. The photopolymerizable composition of claim 1 wherein said catalyst is employed and is selected from the group consisting of a triorgano alkyl or aryl substituted phosphine and a triorgano alkyl or aryl substituted arsine.

7. A method of forming in a photopolymerizable material a fixed image having sufficient optical density to be visible, said material comprising a supported film layer, said layer comprising (A) a photopolymerizable ethylenically unsaturated monomer capable of polymerization by free radical initiated addition polymerization, (B) a photopolymerization initiator system, said system comprising (1) a photo-oxidant dye capable of being raised to a photoactive state by the absorption of radiation having wave-length between about 3800 A. to about 7200 A. and (2) a reducing agent for the said dye, or a catalyst for the said dye selected from the group consisting of (a) an aromatic or aliphatic sulfinic acid, or inorganic salts and organic esters thereof, sulfinic halides, sulfinamide and an adduct derived from the combination of an aromatic or aliphatic sulfinic acid with a carbonyl compound, (b) tri-organic aryl and alkyl substituted phosphines, and (c) tri-organic aryl and alkyl substituted arsines, and (C) an ionizable nitro group substituted aryl carboxylic acid compound or soluble salt thereof in an ionizing carrier medium which is capable of preventing the initiator system from polymerizing said monomer by a nitrobenzyl moiety carboxylate anion when irridiated with radiation in the wave-length range of about 2000 A. to about 4000 A., the method comprising the following steps;

irridiating said photopolymerizable material with imaging radiation in the wave-length range of about 3800 A. to about 7200 A. in order to produce a photopolymerized image in the exposed area having sufficient optical density to be visible, and irridiating said imaged photopolymerizable material with radiation substantially uniformly in the wave-length range of about 2000 A. to about 4000 A. such that the image is fixed by desensitizing the polymerization initiator system.

8. The method of claim 7 wherein the photooxidant dye is a quinoidal dye.

9. The method of claim 7 wherein the photooxidant dye is selected from the group consisting of phenothiazine dye isoalloxazine dye, phenazine dye, acridine dye, thiazole dye and xanthene dye.

10. The method of claim 7 wherein said carboxylic acid compound or soluble salt thereof is selected from the group consisting of 5-nitro-o-toluic acid; 4,4'-dinitrobibenzyl-2,2'-dicarboxylic acid; 2-(4-nitrobenzyl)benzoic acid; 2-(2-nitrobenzyl)benzoic acid; 4-(4-nitrobenzyl)benzoic acid; 4-nitrophenylacetic acid; 4-nitrohomophthalic acid; 4,4'-dinitrodiphenylacetic acid; 2,4-dinitrophenylacetic acid; 3 carboxy 4-nitrophenylacetic acid; and 2-nitro-5-benzylbenzoic acid, including the soluble alkaryl, arylalkyl, aryl and alkyl derivatives thereof and the solubule barium, sodium, potassium, lithium, calcium, strontium, zinc, silver, and aluminum salt derivatives, and mixtures of said materials comprising compounds having a benzyl moiety containing one or more nitro groups and having the property of desensitizing the photopolymerization of the said photopolymerizable composition by said initiator combination when irradiated with ultraviolet light.

11. The method of claim 7 wherein said catalyst material is selected from the group consisting of an organic sulfinic acid, a sulfinyl halide, a sulfinamide, an inorganic salt of an organic sulfinic acid, and organic ester derivative of an organic sulfinic acid, and an adduct derived from the combination of an organic sulfinic acid with a carbonyl compound.

12. The method of claim 7 wherein said catalyst is employed and is selected from the group consisting of a triorgano alkyl or aryl substituted phosphine and a tri-organo alkyl or aryl substituted arsine.

13. A method of forming in a photopolymerizable material a fixed image having sufficient optical density to be visible, said material comprising a supported film layer, said layer comprising (A) a photopolymerizable ethylenically unsaturated monomer capable of polymerization by free radical initiated addition polymerization, (B) a photopolymerization initiator system, said system comprising (1) a photo-oxidant dye capable of being raised to a photoactive state by the absorption of radiation having wave-length between about 3800 A. to about 7200 A. and (2) a reducing agent for the said dye, or a catalyst for the said dye selected from the group consisting of (a) an aromatic or aliphatic sulfinic acid, or inorganic salts and organic esters thereof, sulfinic halides, sulfinamide and an adduct derived from the combination of an aromatic or aliphatic sulfinic acid with a carbonyl compound, (b) tri-organic aryl and alkyl substituted phosphines, and (c) tri-organic aryl and alkyl substituted arsines, and (C) an ionizable nitro group substituted aryl carboxylic acid compound or soluble salt thereof in an ionizing carrier medium which is capable of preventing the initiator system from polymerizing said monomer by a nitrobenzyl moiety carboxylate anion when irridiated with radiation in the wave-length range of about 2000 A. to about 4000 A., the method comprising the following steps;

irridiating said photopolymerizable material with imaging radiation in the wave-length range of about 2000 A. to about 4000 A. such that the exposed area are photopolymerization inhibited by the desensitization of the polymerization initiator system, and irridiating said imaged photopolymerizable material with radiation substantially uniformly in the wave-length range of about 3800 A. to about 7200 A. to produce a photopolymerized image in the area of the said photopolymerizable material which was not exposed during the imagewise irradiation step, said image having sufficient optical density to be visible.

14. The method of claim 13 wherein the photooxidant dye is a quinoidal dye.

15. The method of claim 13 wherein the photooxidant dye is selected from the group consisting of a phenothiazine dye, a isoalloxazine dye, a phenazine dye, an acridine dye, a thiazole dye, and a xanthene dye.

16. The method of claim 13 wherein said desensitizing material is selected from the group consisting of 5-nitro-o-toluic acid; 4,4'-dinitrobibenzyl-2,2'-dicarboxylic acid; 2-(4-nitrobenzyl)benzoic acid; 2-(2-nitrobenzyl)benzoic acid; 4-(4-nitrobenzyl)benzoic acid; 4-nitrophenylacetic acid; 4-nitrohomophthalic acid; 4,4'-dinitrodiphenylacetic acid; 2,4-dinitrophenylacetic acid, 3-carboxy 4-nitrophenylacetic acid; and 2-nitro-5-benzylbenzoic acid, including the soluble alkaryl, aryl-alkyl, aryl and alkyl derivatives thereof and the soluble barium, sodium, potassium, lithium, calcium, strontium, zinc, silver, and aluminum salt derivatives, and mixtures of said materials comprising compounds having a benzyl moiety containing one or more nitro groups and having the property of desensitizing the photopolymerization of the said photopolymerizable composition by said initiator combination when irradiated with ultraviolet light.

17. The method of claim 13 wherein said catalyst is employed and is selected from the group consisting of an organic sulfinic acid, a sulfinyl halide, a sulfinamide, an inorganic salt of an organic sulfinic acid, an organic ester derivative of an organic sulfinic acid, and an adduct derived from the combination of an organic sulfinic acid with a carbonyl compound.

18. The method of claim 13 wherein said catalyst is employed and is selected from the group consisting of a triorgano alkyl or aryl substituted phosphine and a tri-orgono alkyl or aryl substituted arsine.

References Cited

UNITED STATES PATENTS

| | | | |
|---|---|---|---|
| 2,875,047 | 2/1959 | Oster | 96—35.1 |
| 2,989,455 | 6/1961 | Neugebauer et al. | 204—159.23 |
| 2,996,381 | 8/1961 | Oster et al. | 96—115X |
| 3,047,422 | 7/1962 | Sites et al. | 96—115X |
| 3,050,390 | 8/1962 | Levinos et al. | 96—35.1 |
| 3,110,592 | 11/1963 | Schwerin et al. | 96—115X |
| 3,129,098 | 4/1964 | Kitson | 96—35.1 |
| 3,144,331 | 8/1964 | Thommes | 96—48X |
| 3,331,761 | 7/1967 | Mao | 204—159.23 |
| 3,352,772 | 11/1967 | Mao | 204—159.24 |
| 3,380,825 | 4/1968 | Webers | 96—115X |
| 3,408,191 | 10/1968 | Jeffers | 96—35.1X |
| 3,418,118 | 12/1968 | Thommes et al. | 96—35.1X |

NORMAN G. TORCHIN, Primary Examiner

C. BOWERS, Assistant Examiner